United States Patent
Fuhr et al.

(10) Patent No.: US 9,331,314 B2
(45) Date of Patent: May 3, 2016

(54) BATTERY MODULE HAVING ELECTROCHEMICAL CELLS WITH INTEGRALLY FORMED TERMINALS

(75) Inventors: Jason Fuhr, Sussex, WI (US); Xugang Zhang, Milwaukee, WI (US); Gary P. Houchin-Miller, Fox Point, WI (US); Dale B. Trester, Milwaukee, WI (US)

(73) Assignee: Johnson Controls—SAFT Advanced Power Solutions LLC, Wilmington, DE (US)

( * ) Notice: Subject to any disclaimer, the term of this patent is extended or adjusted under 35 U.S.C. 154(b) by 0 days.

(21) Appl. No.: 13/186,314

(22) Filed: Jul. 19, 2011

(65) Prior Publication Data

US 2012/0015235 A1 Jan. 19, 2012

Related U.S. Application Data

(63) Continuation of application No. PCT/US2010/021791, filed on Jan. 22, 2010.

(60) Provisional application No. 61/146,994, filed on Jan. 23, 2009.

(51) Int. Cl.
  *H01M 2/02* (2006.01)
  *H01M 2/20* (2006.01)
  (Continued)

(52) U.S. Cl.
  CPC ............ *H01M 2/027* (2013.01); *H01M 2/1077* (2013.01); *H01M 2/206* (2013.01); *H01M 2/266* (2013.01); *H01M 2/305* (2013.01); *H01M 2/0217* (2013.01); *H01M 2220/20* (2013.01)

(58) Field of Classification Search
  CPC ............ H01M 2/0215; H01M 2/0426; H01M 2/0422; H01M 2/266; H01M 2/204; H01M 2/24; H01M 2/307; H01M 2/305; H01M 2/206; H01M 2/06; H01M 2/0232; H01M 2/0217; H01M 2/023; H01M 2/0225; H01M 2/022; H01M 2/027; H01M 2/046; H01M 2/0473; H01M 2/202
  USPC .......................................... 429/178, 179, 157
  See application file for complete search history.

(56) References Cited

U.S. PATENT DOCUMENTS 4,581,306 A * 4/1986 Hasenauer et al. ........... 429/123
6,461,757 B1 * 10/2002 Sasayama et al. .............. 429/59

(Continued)

FOREIGN PATENT DOCUMENTS

CN      1705155 A    12/2005
CN    201051525 Y     4/2008

(Continued)

OTHER PUBLICATIONS

International Search Report and Written Opinion for International Application No. PCT/US2010/021791, mail date Aug. 13, 2010, 10 pages.

(Continued)

*Primary Examiner* — Maria J Laios
*Assistant Examiner* — Robert S. Carrico
(74) *Attorney, Agent, or Firm* — Fletcher Yoder, P.C.

(57) ABSTRACT

An electrochemical cell includes a housing and a lid coupled to the housing. The electrochemical cell also includes a first member conductively coupled to the housing and configured to act as a first terminal for the electrochemical cell. The electrochemical cell further includes a second member electrically insulated from the lid and configured to act as a second terminal for the electrochemical cell. A first portion of the second member extends through the lid and a second portion of the second member extends in a direction generally perpendicular to the first portion.

22 Claims, 16 Drawing Sheets

(51) Int. Cl.
*H01M 2/30* (2006.01)
*H01M 2/10* (2006.01)
*H01M 2/26* (2006.01)

(56) References Cited

U.S. PATENT DOCUMENTS

| | | | |
|---|---|---|---|
| 6,579,640 B1 * | 6/2003 | Nagase et al. | 429/54 |
| 6,767,666 B2 * | 7/2004 | Nemoto et al. | 429/120 |
| 7,927,726 B2 | 4/2011 | Kim | |
| 2007/0141458 A1 | 6/2007 | Nagatani et al. | |
| 2008/0160395 A1 | 7/2008 | Okada et al. | |
| 2009/0162738 A1 * | 6/2009 | Jiang et al. | 429/90 |

FOREIGN PATENT DOCUMENTS

| | | |
|---|---|---|
| JP | 2007012487 A | 1/2007 |
| WO | 2008002024 A1 | 1/2008 |
| WO | WO 2008/021230 A2 | 2/2008 |
| WO | WO 2008/086417 A2 | 7/2008 |
| WO | WO 2008098193 A2 * | 8/2008 ............ H01M 2/202 |

OTHER PUBLICATIONS

Chinese Office Action for Chinese Patent Application 201080011521.7 dated Feb. 21, 2014; 6 pgs.

Office Action for Chinese Application No. 201080011521.7 dated Jul. 31, 2013, 9 pgs.

Chinese Office Action for Chinese Application No. 201080011521.7 dated Aug. 14, 2014; 7 pgs.

Supplementary European search report and European search opinion for EP Patent Application No. 10733894.9 dated Feb. 17, 2014; 5 pgs.

* cited by examiner

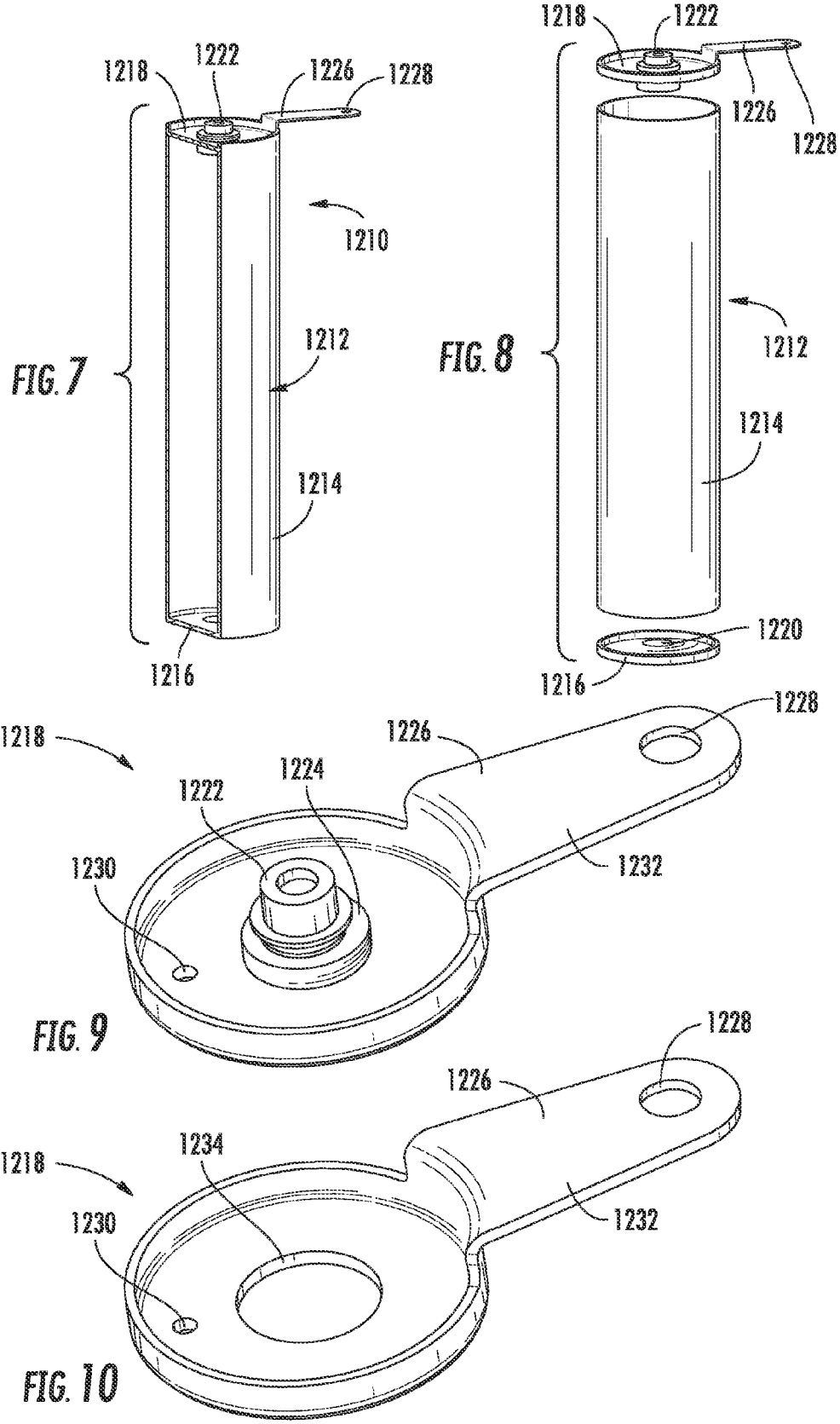

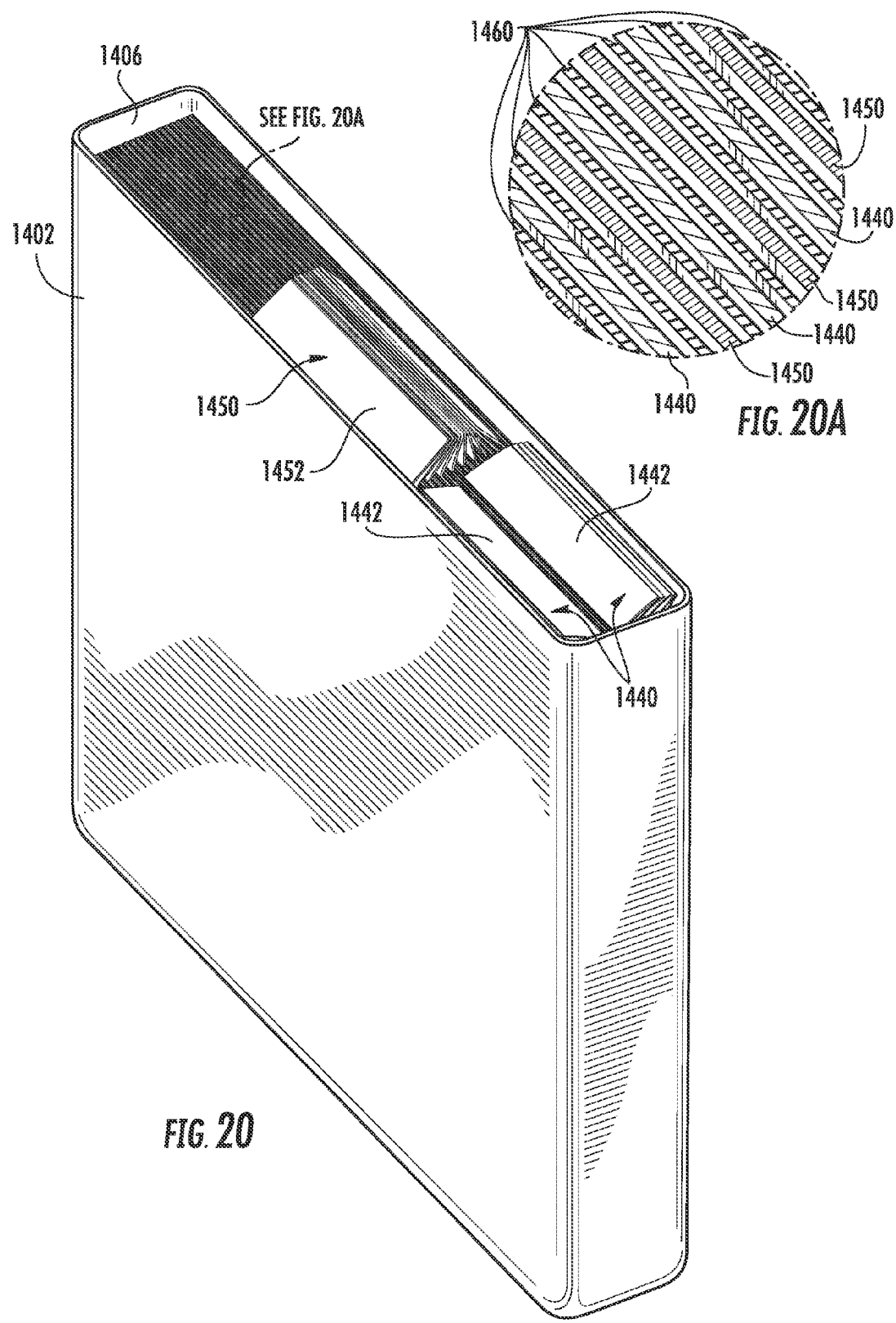

BATTERY MODULE HAVING ELECTROCHEMICAL CELLS WITH INTEGRALLY FORMED TERMINALS

CROSS-REFERENCE TO RELATED PATENT APPLICATIONS

This application is a continuation of International Patent Application No. PCT/US2010/021791, filed Jan. 22, 2010, which claims the benefit of and priority to U.S. Provisional Patent Application No. 61/146,994, filed Jan. 23, 2009. The entire disclosures of International Patent Application No. PCT/US2010/021791 and U.S. Provisional Patent Application No. 61/146,994 are incorporated herein by reference.

BACKGROUND

The present application relates generally to the field of batteries and battery modules. More specifically, the present application relates to batteries and battery modules that may be used in vehicle applications to provide at least a portion of the motive power for the vehicle.

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles") may provide a number of advantages as compared to more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, as is the case of certain types of PHEVs).

As electric vehicle technology continues to evolve, there is a need to provide improved power sources (e.g., battery systems or modules) for such vehicles. For example, it is desirable to increase the distance that such vehicles may travel without the need to recharge the batteries. It is also desirable to improve the performance of such batteries and to reduce the cost associated with the battery systems.

One area of improvement that continues to develop is in the area of battery chemistry. Early electric vehicle systems employed nickel-metal-hydride (NiMH) batteries as a propulsion source. Over time, different additives and modifications have improved the performance, reliability, and utility of NiMH batteries.

More recently, manufacturers have begun to develop lithium-ion batteries that may be used in electric vehicles. There are several advantages associated with using lithium-ion batteries for vehicle applications. For example, lithium-ion batteries have a higher charge density and specific power than NiMH batteries. Stated another way, lithium-ion batteries may be smaller than NiMH batteries while storing the same amount of charge, which may allow for weight and space savings in the electric vehicle (or, alternatively, this feature may allow manufacturers to provide a greater amount of power for the vehicle without increasing the weight of the vehicle or the space taken up by the battery system).

It is generally known that lithium-ion batteries perform differently than NiMH batteries and may present design and engineering challenges that differ from those presented with NiMH battery technology. For example, lithium-ion batteries may be more susceptible to variations in battery temperature than comparable NiMH batteries, and thus systems may be used to regulate the temperatures of the lithium-ion batteries during vehicle operation. The manufacture of lithium-ion batteries also presents challenges unique to this battery chemistry, and new methods and systems are being developed to address such challenges.

It would be desirable to provide an improved battery module and/or system for use in electric vehicles that addresses one or more challenges associated with NiMH and/or lithium-ion battery systems used in such vehicles. It also would be desirable to provide a battery module and/or system that includes any one or more of the advantageous features that will be apparent from a review of the present disclosure.

SUMMARY

According to an exemplary embodiment, an electrochemical cell includes a housing and a lid coupled to the housing. The electrochemical cell also includes a first member conductively coupled to the housing and configured to act as a first terminal for the electrochemical cell. The electrochemical cell further includes a second member electrically insulated from the lid and configured to act as a second terminal for the electrochemical cell. A first portion of the second member extends through the lid and a second portion of the second member extends in a direction generally perpendicular to the first portion.

According to another exemplary embodiment, an electrochemical cell includes a housing having a cover conductively coupled to the housing and a first terminal conductively coupled to the housing. The electrochemical cell also includes a second terminal electrically insulated from the cover. The second terminal includes a first portion that extends through an aperture defined by the cover and a second portion that extends at a generally right angle to the first portion.

According to another exemplary embodiment, a battery module includes a plurality of electrochemical cells. Each electrochemical cell includes a housing having a lid coupled to the housing and a first member conductively coupled to the housing. The first member is configured to act as a first terminal for the electrochemical cell. Each electrochemical cell also includes a second member electrically insulated from the lid. The second member is configured to act as a second terminal for the electrochemical cell. A first portion of the second member extends through an opening in the lid and a second portion of the second member extends in a direction generally perpendicular to the first portion. The first terminal of a first electrochemical cell is conductively coupled to a terminal of an adjacent electrochemical cell.

BRIEF DESCRIPTION OF THE FIGURES

FIG. 7 is a cutaway perspective view of a portion of an electrochemical cell shown without electrodes according to an exemplary embodiment.

FIG. 8 is an exploded view of the electrochemical cell as shown in FIG. 7.

FIG. 9 is a perspective view of a lid having an integral bus bar coupled to a terminal according to an exemplary embodiment.

FIG. 10 is a perspective view of the lid as shown in FIG. 9.

FIG. 20 is a perspective view of the electrochemical cell shown in FIG. 19 with the lid removed according to an exemplary embodiment.

FIG. 20A is a partial exploded detail perspective view of a portion of the electrochemical cell shown in FIG. 20 according to an exemplary embodiment.

DETAILED DESCRIPTION

Figure 1:
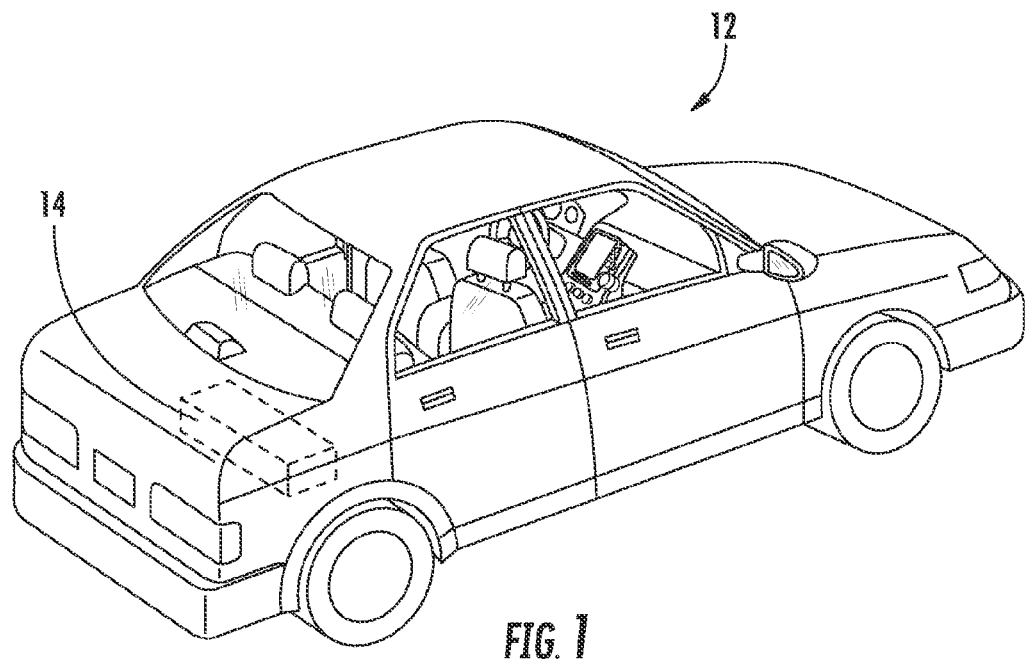
FIG. 1 is a perspective view of a vehicle having a battery system according to an exemplary embodiment.

Referring to FIG. 1, a vehicle 12 is shown according to an exemplary embodiment and includes a battery system 14. The size, shape, configuration, and location of the battery system 14 and the type of vehicle 12 may vary according to various exemplary embodiments. For example, while the vehicle 12 in FIG. 1 is shown as an automobile, according to various exemplary embodiments, vehicle 12 may comprise a wide variety of differing types of vehicles including, among others, motorcycles, buses, recreational vehicles, boats, and the like. According to an exemplary embodiment, the vehicle 12 has a battery system 14 for providing all or a portion of the motive power for the vehicle 12. Such a vehicle can be an electric vehicle (EV), a hybrid electric vehicle (HEV), a plug-in hybrid electric vehicle (PHEV), or other type of vehicle using electric power for propulsion (collectively referred to as "electric vehicles").

Although the battery system 14 is illustrated in FIG. 1 as being positioned in the trunk or rear of the vehicle 12, according to other exemplary embodiments, the location of the battery system 14 may differ. For example, the position of the battery system 14 may be selected based on the available space within the vehicle 12, the desired weight balance of the vehicle 12, the location of other components used with the battery system 14 (e.g., battery management systems, vents or cooling devices, etc.), and a variety of other considerations.

Figure 2:
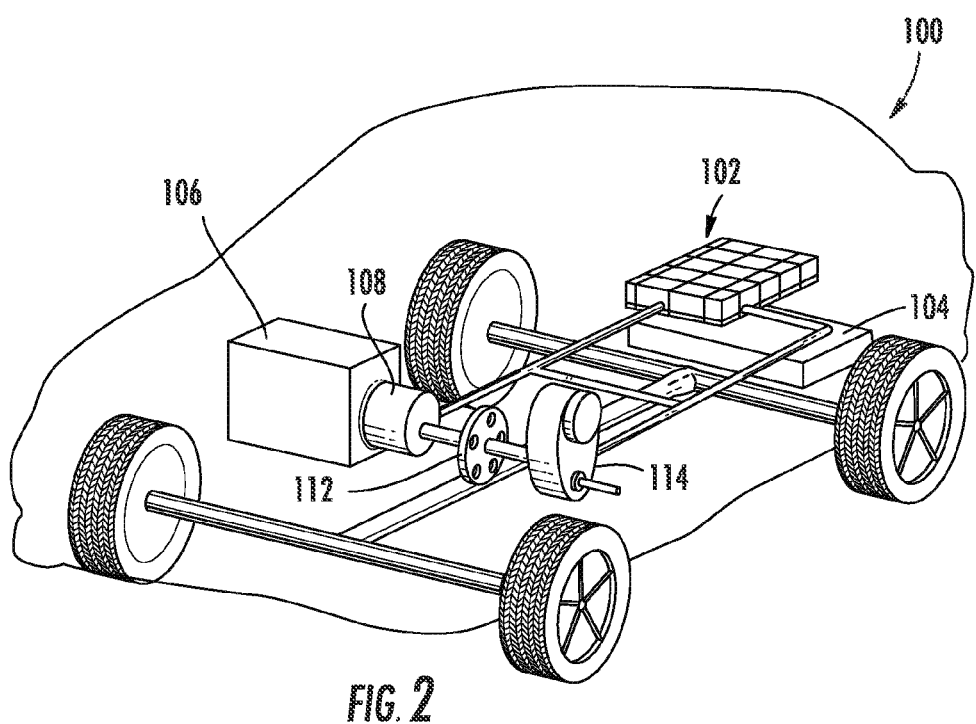
FIG. 2 is a schematic cutaway view of a hybrid electric vehicle according to an exemplary embodiment.

FIG. 2 illustrates a cutaway schematic view of a vehicle 100 provided in the form of a PHEV according to an exemplary embodiment. A battery system 102 is provided toward the rear of the vehicle 100 proximate to a fuel tank 104 (battery system 102 may be provided immediately adjacent to the fuel tank 104 or may be provided in a separate compartment in the rear of the vehicle 100 (e.g., a trunk) or may be provided elsewhere in the vehicle 100). An internal combustion engine 106 is provided for times when the vehicle 100 utilizes gasoline power to propel itself. An electric motor 108, a power split device 112, and a generator 114 are also provided as part of the vehicle drive system of vehicle 100. The vehicle 100 may be powered or driven by just the battery system 102, by just the engine 106, or by both the battery system 102 and the engine 106.

It should be noted that other types of vehicles and configurations for the vehicle electrical system may be used according to other exemplary embodiments, and that the schematic illustration of FIG. 2 should not be considered to limit the scope of the subject matter described in the present application.

Figure 3:
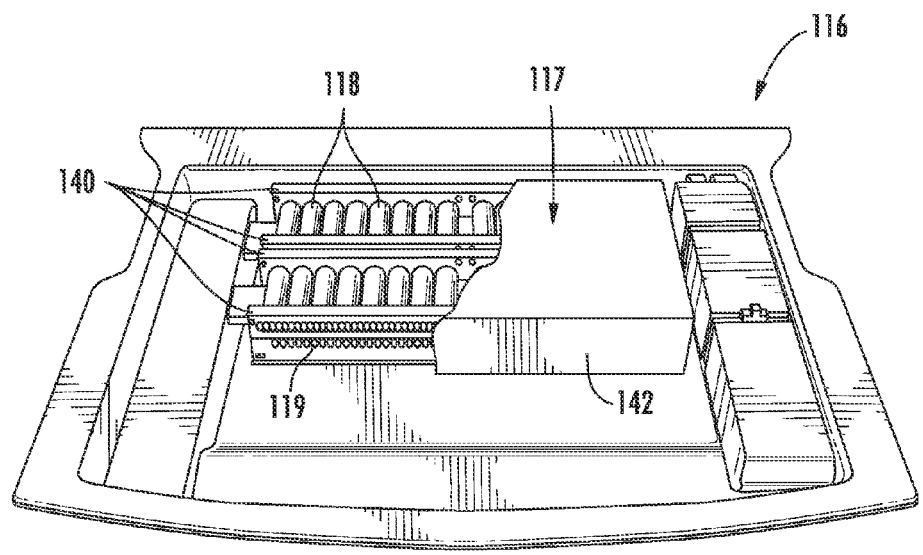
FIG. 3 is a cutaway perspective view of a battery system according to an exemplary embodiment.

Referring to FIG. 3, a battery system 116 is shown according to an exemplary embodiment and includes a battery module 117 containing electrochemical cells or batteries 118. According to an exemplary embodiment, the battery module 117 includes features or components for connecting the electrochemical cells 118 to each other and/or to other components of the vehicle electrical system, and also for regulating the electrochemical cells 118 and other features of the battery system 116. For example, the battery system 116 may include features that are responsible for monitoring and controlling the electrical performance of the battery system 116, managing the thermal behavior of the battery system 116, containment and/or routing of effluent (e.g., gases that may be vented from a cell 118), and other aspects of the battery system 116.

According to an exemplary embodiment, the battery module 117 includes a plurality of electrochemical cells or batteries 118 (e.g., lithium-ion cells, nickel-metal-hydride cells, lithium polymer cells, etc., or other types of electrochemical cells now known or hereafter developed). According to an exemplary embodiment, the electrochemical cells 118 are generally cylindrical lithium-ion cells configured to store an electrical charge.

Figure 4:
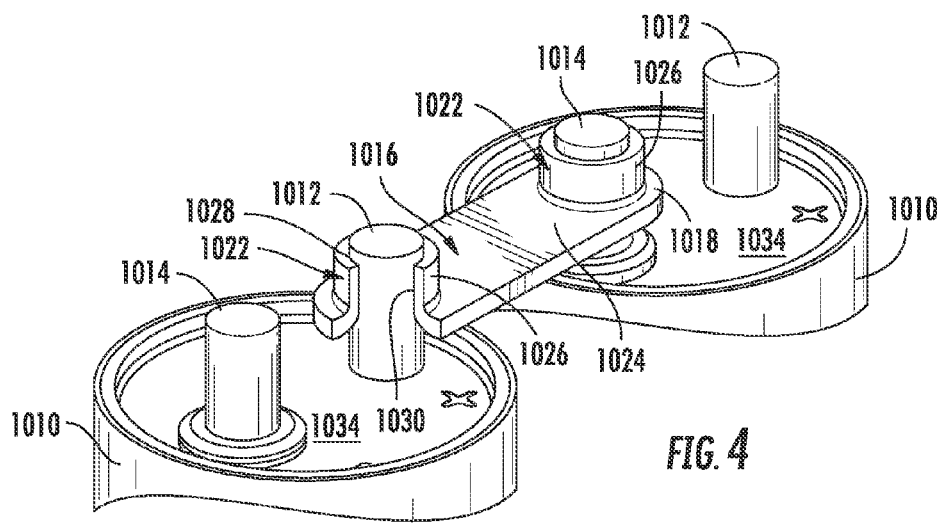
FIG. 4 is a perspective view of a first electrochemical cell coupled to a second electrochemical cell with a bus bar according to an exemplary embodiment.

According to other exemplary embodiments, cells 118 could have other physical configurations (e.g., oval, prismatic, polygonal, etc.). The capacity, size, design, and other features of the cells 118 may also differ from those shown according to other exemplary embodiments. According to an exemplary embodiment, the cells 118 each have at least one terminal 119 located at an end thereof (e.g., as shown in FIG. 3). According to another exemplary embodiment, the cells each have two terminals (e.g., as shown in FIG. 4, a first or positive terminal 1012, and a second or negative terminal 1014) located at an end thereof.

According to various exemplary embodiments, the size, shape, and location of the battery module 117 or battery system 116, the type of vehicle 100, the type of vehicle technology (e.g., EV, HEV, PHEV, etc.), and the battery chemistry, among other features, may differ from those shown or described.

Although illustrated in FIG. 3 as having a particular number of electrochemical cells 118, it should be noted that according to other exemplary embodiments, a different number and/or arrangement of electrochemical cells 118 may be used depending on any of a variety of considerations (e.g., the desired power for the battery system 116, the available space within which the battery system 116 must fit, etc.).

According to an exemplary embodiment, a series of members or elements in the form of trays 140 or similar structures are provided to contain the various cells 118 in relation to each other. The trays 140 may be made of a polymeric material or other suitable materials (e.g., electrically insulative materials). The trays 140 may also include features to provide spacing of the cells 118 away from the surface of the trays 140 and/or from adjacent cells 118. A housing or cover 142 and a base plate (not shown) may be provided to partially or completely surround or enclose the cells 118 and trays 140.

While FIG. 3 shows an exemplary embodiment of a battery module 117, it should be understood that the battery module 117 is not limited to any particular arrangement as will be appreciated by those reviewing this disclosure. For instance, while the battery module 117 shown in FIG. 3 is shown with horizontally oriented cells 118 arranged back-to-back in two banks or groups by parallel frame members (i.e., trays 140), it should be understood that the battery module 117 may have many different configurations. For example, the cells 118 may also be generally vertical, be several separate groups, or arranged in other configurations. Furthermore, different numbers and types (e.g., nickel-metal-hydride, etc.) of cells 118 may be used. The cover 142 may include features (e.g., sidewalls, etc.) that are intended to receive and arrange the cells 118.

Referring now to FIG. 4, a method of connecting the terminals 1012, 1014 of adjacent cells 1010 is shown according to an exemplary embodiment. Each of the cells 1010 are electrically coupled to one or more other cells 1010 or other components of the battery system 116 (shown, e.g., in FIG. 3) using connectors provided in the form of bus bars 1016 or similar elements. For example, FIG. 4 shows two cells 1010 coupled together with a bus bar 1016 according to an exemplary embodiment. A portion of the bus bar 1016 is shown as a broken view to show the interface between the bus bar 1016 and the terminal 1012. The bus bar 1016 is a metallic member (e.g., copper, copper alloy, aluminum, aluminum alloy, etc.) that couples the negative terminal 1014 of a first cell 1010 to the positive terminal 1012 of a second cell 1010. The bus bar 1016 includes a first end 1018 that is coupled to the negative terminal 1014 of the first cell 1010 (e.g., by an interference fit, by welding, etc.) and a second end 1020 that is coupled to the positive terminal 1012 of a second cell 1010 (e.g., by an interference fit, by welding etc.).

The first end 1018 and the second end 1020 of the bus bar 1016 each include a projection 1022 (e.g., protruding ridge, lip, flange, extension, etc.) that is configured to substantially surround the terminal 1012, 1014 of a cell 1010. The projection 1022 may be cast or formed by a mechanical process such as a stamping operation, a punching operation, or an extrusion operation. The mechanical process causes the projection 1022 to extend outward from the top surface 1024 of the bus bar 1016. The projection 1022 forms a generally vertical wall 1026 that defines an aperture 1028 that is configured to receive the terminal 1012, 1014 of the projection 1022.

According to an exemplary embodiment, the aperture 1028 has a diameter that is smaller than the diameter of the terminal 1012, 1014 so that the bus bar 1016 is coupled to the cell 1010 with an interference fit when the terminal 1012, 1014 is received by the aperture 1028. The bus bar 1016 is assembled with the cells 1010 by first heating the bus bar 1016 (e.g., by induction heating, by an oven, by a flame or heating element, etc.). According to an exemplary embodiment, the heating of the bus bar 1016 occurs as part of an assembly line process where the bus bars 1016 being are heated (e.g., in an oven) in the assembly line and directly assembled with the cells 1010.

According to an exemplary embodiment, the bus bar 1016 is heated to a temperature sufficient to expand the material of the bus bar 1016, widening the aperture 1028 formed by the projection 1022 and allowing the terminal 1012, 1014 to be received by the aperture 1028 in the bus bar 1016. According to various exemplary embodiments, these temperatures may vary depending on the material properties of the bus bars 1016 (e.g., coefficient of thermal expansion). As the bus bar 1016 cools, the diameter of the aperture 1028 shrinks, forming an interference fit with the terminal 1012, 1014. An insulator 1132 (e.g., as shown in FIG. 5) may be provided below the bus bar 1016 and around the terminal 1012, 1014 to reduce the chance of inadvertent contact between the bus bar 1016 and the lid or cover 1034 of the cell 1010.

The bus bar 1016 may be further coupled to the cell 1010 with a welding operation such as an ultrasonic welding operation, a laser welding operation, or a resistance welding operation. According to another exemplary embodiment, the bus bar 1016 may only be welded to the terminals 1012, 1014 of the cells 1010 instead of being provided with an interference fit and welded to the terminals 1012, 1014 of the cells 1010. According to another exemplary embodiment, the bus bar 1016 may only be press fit to the terminals 1012, 1014 of the cells 1010 instead of being welded to the terminals 1012, 1014 of the cells 1010.

Figure 5:
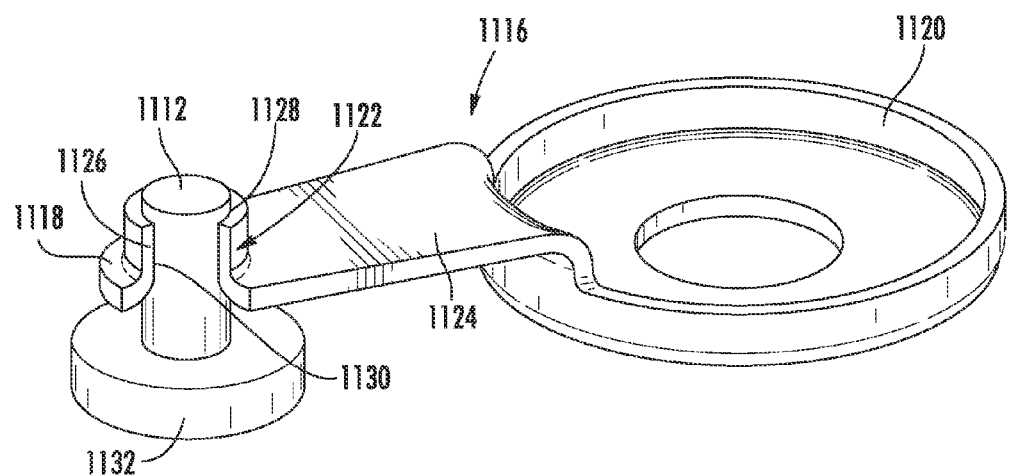
FIG. 5 is a perspective view of a bus bar coupled to a terminal of an adjacent electrochemical cell according to an exemplary embodiment.
Figure 6:
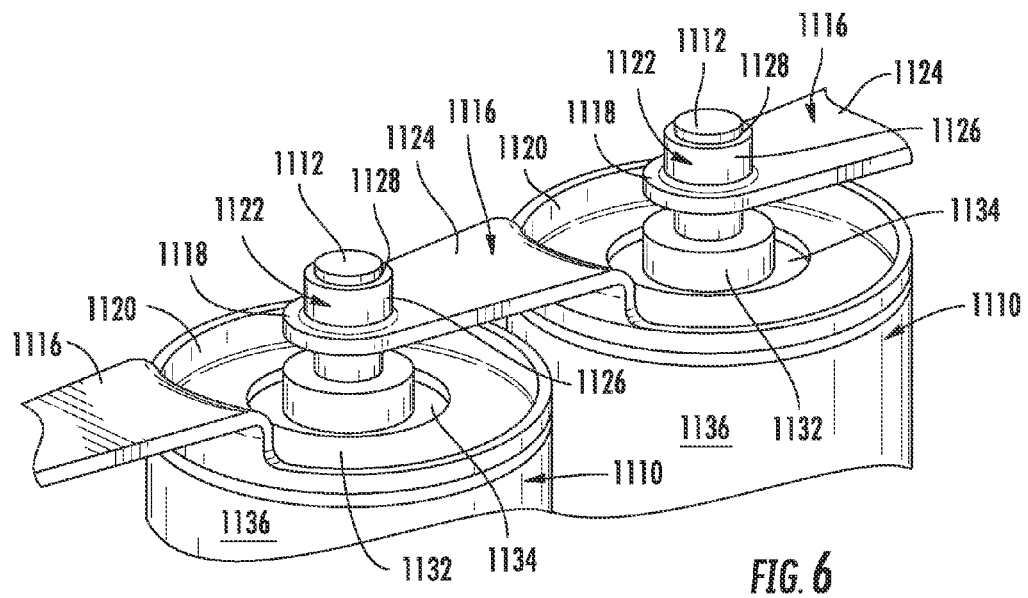
FIG. 6 is a perspective view of a portion of a battery module having a first electrochemical cell coupled to a second electrochemical cell with the bus bar as shown in FIG. 5.

FIGS. 5-6 show a bus bar 1116 according to another exemplary embodiment coupled to a terminal 1112 of a cell 1110. A portion of the bus bar 1116 is shown as a broken view to show the interface between the bus bar 1116 and the terminal 1112. The bus bar 1116 is a metallic member (e.g., copper, copper alloy, aluminum, aluminum alloy, etc.) that couples a first cell 1110 to a second cell (e.g., as shown in FIG. 6). The bus bar 1116 includes a first end 1118 that is coupled to a terminal 1112 of the first cell 1110 (e.g., by an interference fit, by welding, etc.) and a second end 1120 that is coupled to the housing 1136 of the second cell 1110 (e.g., by a press fit, by an interference fit, by welding, etc.). The first end 1118 of the bus bar 1116 shown in FIG. 5 is similar to the first end 1018 of the bus bar 1016 shown in FIG. 4. However, the second end 1120 of the bus bar 1116 shown in FIG. 5 is configured to be coupled to the housing 1136 of a second adjacent cell 1110 and to act as a cover for the second cell.

The first end 1118 of the bus bar 1116 includes a projection 1122 (e.g., protruding ridge, lip, flange, extension, etc.) that is configured to substantially surround the terminal 1112 of a first cell 1110. The projection 1122 may be cast or may be formed by a mechanical process such as a stamping operation, a punching operation, or an extrusion operation. The mechanical process causes the projection 1122 to extend outward from a top surface 1124 of the bus bar 1116. The projection 1122 forms a generally vertical wall 1126 that defines an aperture 1128 that is configured to receive the terminal 1112 of the cell 1010. In other words, the terminal 1112 is received in the aperture 1128 defined by the projection 1122 of the bus bar 1116 such that contact is made between the terminal 1112 and an inner surface 1130 of the projection 1122.

FIG. 6 shows a portion of a battery module including two cells 1110 coupled together with the bus bar 1116 of FIG. 5. The cells 1110 are generally cylindrical bodies with a top or first surface 1134 having a terminal 1112 (e.g., a negative terminal, a positive terminal) that extends generally upward from the top surface 1134. The terminal 1112 is electrically coupled to a first electrode (not shown) inside the housing 1136 of the cell 1110 (e.g., a negative electrode, a positive electrode). However, the terminal 1112 is electrically insulated from the housing 1136 itself (e.g., by an insulator 1132). The housing 1136 of the cell 1110, including the top surface 1134 of the cell 1110, is electrically coupled to a second electrode (not shown) inside the housing 1136 of the cell 1010 (e.g., a positive electrode, a negative electrode).

The bus bar 1116 is coupled to the cells 1110 by first coupling the second end 1120 of the bus bar 1116 to the top surface 1134 of the of the second cell 1110. According to an exemplary embodiment, the second end 1120 of the bus bar 1116 is press fit into the top of the housing 1136 of the second cell 1110 and then welded (e.g., ultrasonic, laser, resistance, etc.) to form a cover for the cell 1110 (i.e., the cover includes an extension or flange that acts as a bus bar or terminal for coupling to an adjacent cell). According to another exemplary embodiment, the second end 1120 of the bus bar 1116 is larger than the diameter of the top of the second cell 1110 and is coupled to the top of the second cell 1110 with an interference fit. The second end 1120 of the bus bar 1116 is shrunk (e.g., reduced in size, made smaller, etc.) by a cooling process (e.g., using liquid nitrogen). The second end 1120 of the bus bar 1116 is then placed into the open end of the top of the second cell 1110 and allowed to return to room temperature. The second end 1120 of the bus bar 1116 may then be further coupled to the cell 1110 by a welding operation such as an ultrasonic welding operation, a laser welding operation, or a resistance welding operation.

The first end 1118 of the bus bar 1116 is then coupled to the terminal 1112 of the first cell 1110. According to an exemplary embodiment, the first end 1118 of the bus bar 1116 is welded (e.g., ultrasonic, laser, resistance, etc.) to the terminal 1112 of the first cell 1110. According to another exemplary embodiment, the first end 1118 of the bus bar 1116 is press fit to the terminal 1112 of the first cell 1110. According to another exemplary embodiment, the aperture 1128 in the first end 1118 of the bus bar 1116 has a diameter that is smaller than the diameter of the terminal 1112 so that the first end 1118 of the bus bar 1116 is coupled to the terminal 1112 of the first cell 1110 with an interference fit. The first end 1118 of the bus bar 1116 is heated (e.g., by placing the first end 1118 near a heating element or a flame). Heating the first end 1118 of the bus bar 1116 expands the metal, widening the aperture 1128 formed by the projection 1122 and allowing the terminal 1112 to be received in the aperture 1128 in the first end 1118 of the bus bar 1116. As the bus bar 1116 cools, the diameter of the aperture 1128 shrinks, forming an interference fit with the terminal 1112. An insulator 1132 (e.g., as shown in FIG. 6) may be provided below the bus bar 1116 and around the terminal 1112 to reduce the chance of inadvertent contact between the bus bar 1116 and the housing 1136 of the cell 1010. The bus bar 1116 may then be further coupled to the terminal 1112 of the cell 1010 with a welding operation such as an ultrasonic welding operation, a laser welding operation, or a resistance welding operation.

Referring now to FIGS. 7-8, a cell can or housing 1212 (e.g., a container, casing, etc.) for an electrochemical cell 1210 is shown according to an exemplary embodiment. The housing 1212 is configured to receive or house a cell element (e.g., a wound cylindrical cell element) that is not shown. According to an exemplary embodiment, the housing 1212 comprises a three-piece structure, comprising a main body 1214 (that may, e.g., be made from an aluminum tube or tubing), a first cover or bottom 1216, and a second cover or lid 1218 that includes a flange (e.g., a tab, flap, projection, extension, protrusion, projection, lip, overhang, protuberance, etc.) that acts as a bus bar or terminal for coupling the cell 1210 to a terminal of an adjacent cell.

As shown in FIG. 8, the three-piece housing 1212 provides for a flexible design that may be varied (e.g., in length) to provide for various sizes and capacities of cell elements. For example, a different length main body 1214 may be used with the same bottom 1216 and lid 1218. Additionally, internal connections (e.g., current collectors, etc.) may be changed for different applications without affecting the design of the external interface (e.g., the lid 1218, the bus bars 1226, etc.) of the module that the cells 1210 are provided in. Furthermore, this type of separate component design allows for lower cost tooling for development and higher efficiencies in economies of scale in that the same design for the bottom 1216 and the lid 1218 may be used interchangeably with different lengths of the main body 1214.

According to an exemplary embodiment, the separate components (i.e., the main body 1214, bottom 1216, and lid 1218) are easier to clean and handle than previous designs. For example, the main body 1214, bottom 1216, and lid 1218 may be cleaned separately and then assembled together. Previous designs having the bottom or the lid integral with the main body made it difficult to clean the inside of the main body and/or the bottom or lid. Having separate components allows for full accessibility to all of the components of the housing 1212.

Referring now to FIG. 8, the bottom 1216 may have an integral vent feature 1220 according to an exemplary embodiment. The vent feature 1220 may be configured to separate or deploy from the bottom 1216 if the pressure inside the housing 1212 reaches a predetermined amount. Various sized vents 1220 may be used with the bottom 1216, allowing different internal pressures to be obtained depending on the design (e.g., size) of the vent 1220 used. Additionally, the various sized vents 1220 may be interchanged with different sized housings 1212, dependent upon the needs of the application. According to an exemplary embodiment, the bottom

1216 is coupled (e.g., by a welding process, such as laser welding) to a lower portion of the housing 1212.

Referring to FIGS. 9-10, the cover 1218 or lid for the housing 1212 is shown according to an exemplary embodiment. The lid 1218 includes a first terminal 1222 (e.g., a positive terminal) that may be provided, for example, in the center of the lid 1218. The first terminal 1222 is insulated from the lid 1218 by the use of an insulating material or insulating device shown as an insulator 1224. The first terminal 1222 may be coupled to an electrode (e.g., a positive electrode) of the cell element (not shown) with a current collector (not shown). According to an exemplary embodiment, the lid 1218 is coupled (e.g., by a welding process, such as laser welding) to an upper portion of the housing 1212.

Still referring to FIGS. 9-10, the lid 1218 also comprises a member shown as a flange (e.g., a tab, flap, projection, extension, protrusion, projection, lip, overhang, protuberance, etc.) that may act as a terminal or bus bar 1226 for the cell 1210. According to an exemplary embodiment, the bus bar 1226 is integral with the lid 1218 (i.e., the bus bar 1226 and lid 1218 are a single unitary body). Having the bus bar 1226 integral with the lid 1218 reduces the overall component count of the system. Additionally, the number of fasteners (not shown) required (e.g., to couple the bus bars 1226 to the terminals 1222) is reduced. Furthermore, the overall system cost may be reduced by eliminating or reducing the amount of copper used by having integral bus bars 1226.

As shown in FIGS. 9-10, the bus bar 1226 extends out and away from the lid 1218. According to an exemplary embodiment, the bus bar 1226 is at a height that is different (i.e., higher) than the height of the lid 1218, allowing the bus bar 1226 to be placed over (i.e., on top of) a terminal 1222 of an adjacent cell 1210. The bus bar 1226 is configured with an aperture 1228 at an end of the of the bus bar 1226. According to an exemplary embodiment, the aperture 1228 is configured to allow a fastener (not shown) to be placed through the aperture 1228 in order to couple the bus bar 1226 to a terminal 1222 of an adjacent cell 1210.

According to another exemplary embodiment, the lid 1218 may also comprise an aperture or hole shown as fill hole 1230. Fill hole 1230 is configured to allow a substance (e.g., electrolyte) to be placed in the cell 1210 after the cell 1210 is assembled. According to another exemplary embodiment, the lid may also comprise an aperture or hole 1234 (e.g., as shown in FIG. 10) configured to receive the first terminal 1222 and insulator 1224.

According to another exemplary embodiment, the bus bar 1226 may function as a second terminal 1232 (e.g., a negative terminal) of the cell 1210 due to the fact that the bus bar 1226 may be electrically connected to an electrode (e.g., a negative electrode) of the cell element (not shown). The bus bar 1226, being integral with the lid 1218, may be connected to the electrode by the lid 1218 being electrically connected to the main body 1214 of the housing 1212. The main body 1214 of the housing 1212 is electrically connected to the bottom 1216 of the housing 1212, which in turn is then electrically connected to the electrode of the cell element, completing the connection from the bus bar 1226 to the electrode.

Referring now to FIGS. 11-14, a battery module 1300 utilizing cells 1310 having lids 1312 with integral terminals or bus bars 1314 is shown according to an exemplary embodiment. The battery module 1300 may be electrically coupled with other battery modules 1300 to form a battery system (not shown) or may be used independently to form its own battery system. The battery system may include other features (not shown) that are responsible for monitoring and controlling the electrical performance of the system, managing the thermal behavior of the system, containment and/or routing of effluent (e.g., gases that may be vented from a cell 1310), and other aspects of the battery module 1300 or battery system.

Figure 11:
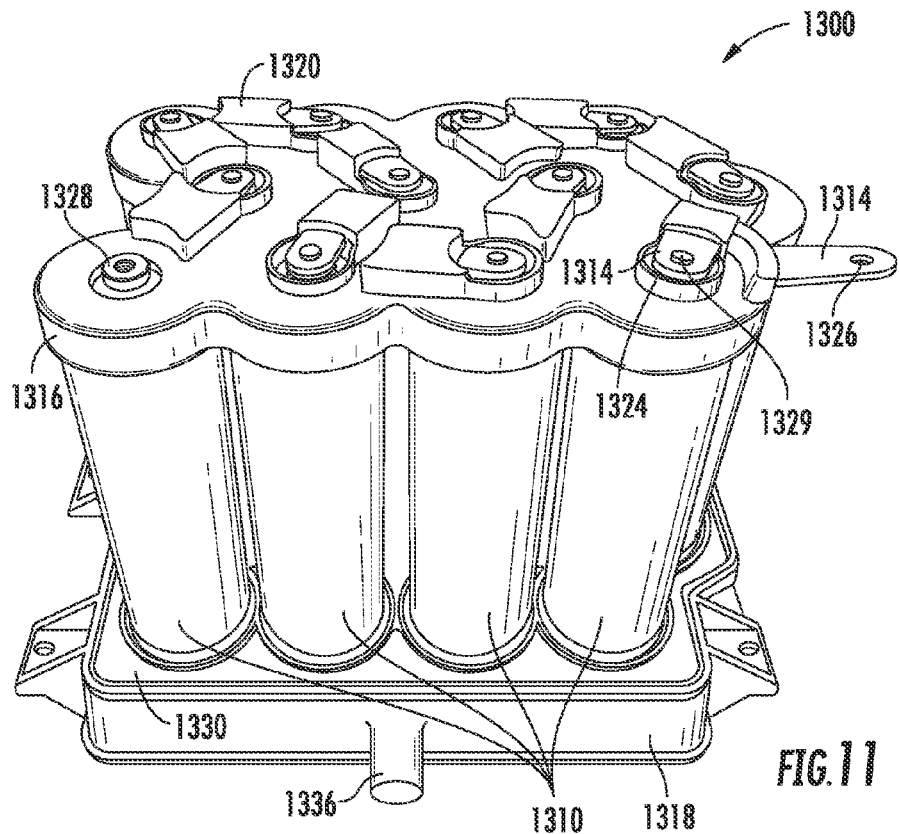
FIG. 11 is a perspective view of a battery module according to an exemplary embodiment.

As shown in FIG. 11, the battery module 1300 includes a plurality of electrochemical cells 1310 each having a flange (e.g., a tab, flap, projection, extension, protrusion, projection, lip, overhang, protuberance, etc.) shown as an integral terminal or bus bar 1314 formed in the lid 1312 of the cell 1310, a first structure or upper tray 1316, and a second structure or the lower tray 1318. The plurality of cells 1310 are provided in between the upper tray 1316 and the lower tray 1318. Although illustrated in FIG. 11 as having a particular number of electrochemical cells 1310, it should be noted that according to other exemplary embodiments, a different number and/or arrangement of electrochemical cells 1310 may be used depending on any of a variety of considerations (e.g., the desired power for the battery module 1300, the available space within which the battery module 1300 must fit, etc.).

According to an exemplary embodiment, the upper tray 1316 comprises features 1320 (e.g., raised portions, cutouts, channels, spaces, molded areas, etc.) that receive the integral bus bars 1314 of the individual cells 1310 to properly orientate or align the cells 1310 (and the integral bus bars 1314) so that the bus bars 1314 are properly aligned to be connected to an adjacent cell 1310. The upper tray 1316 also comprises a feature shown as a wall 1322 (as shown, e.g., in FIG. 14) that partially surrounds the upper portion of the cell 1310 to aid in properly locating the cell 1310. It should be noted that the bus bars 1314 used in connection with the upper tray 1316 need not be integral with the lid 1312 (i.e., the upper tray 1316 will still be able to properly align and orientate cells 1310 having non-integral bus bars 1314).

Figure 22:
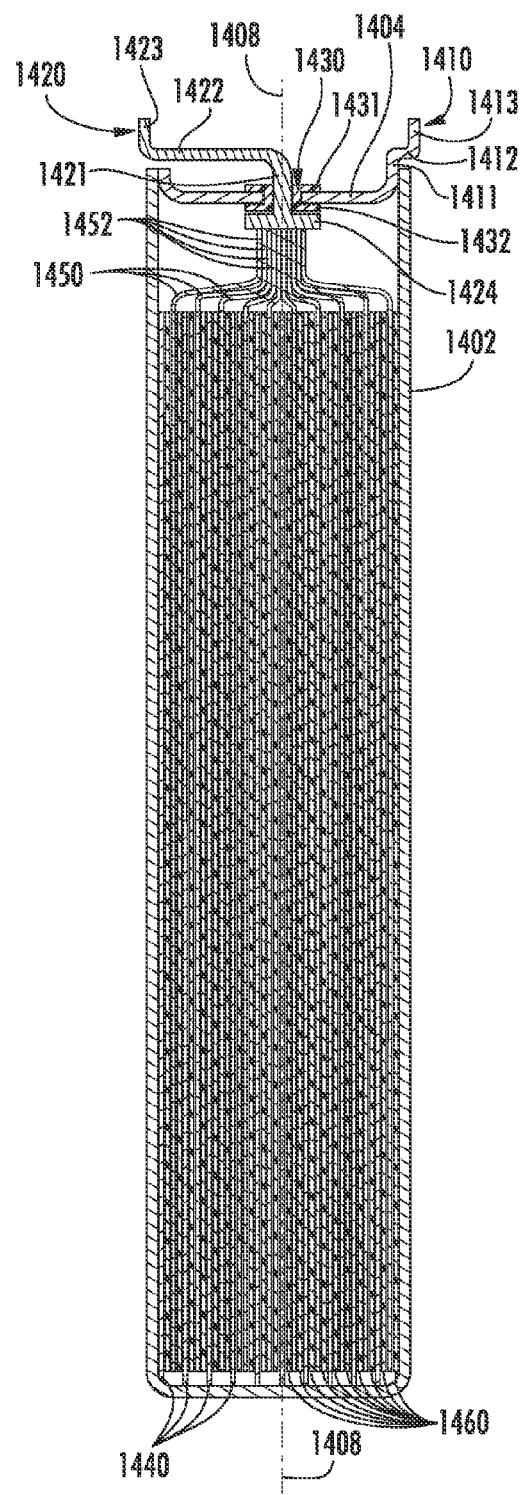
FIG. 22 is a cross-sectional view of the electrochemical cell shown in FIG. 19 taken along lines 22-22 in FIG. 19 according to an exemplary embodiment.
Figure 23:
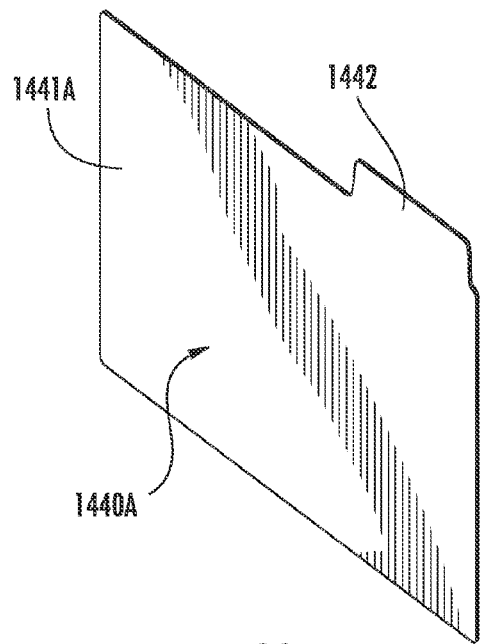
FIG. 23 is a perspective view of an electrode plate for an electrochemical cell according to an exemplary embodiment.
Figure 24:
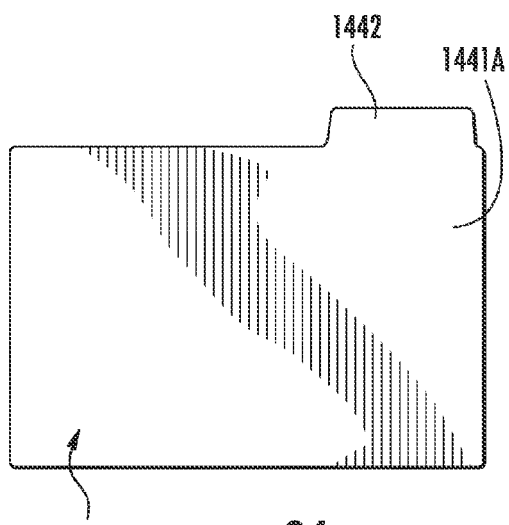
FIG. 24 is a side view of the electrode plate shown in FIG. 23.
Figure 25:
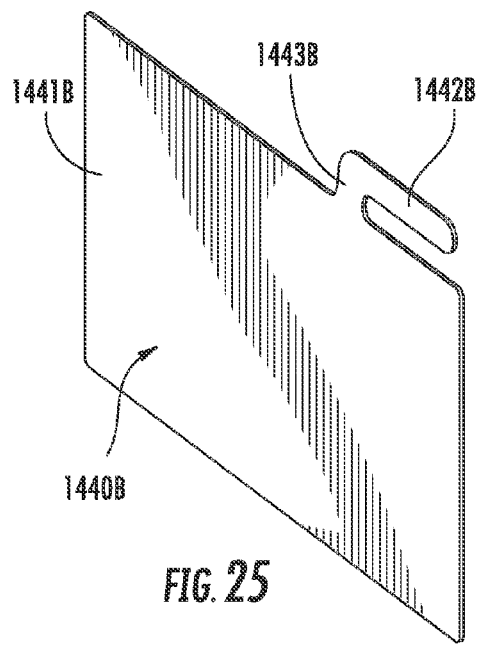
FIG. 25 is a perspective view of an electrode plate for an electrochemical cell according to another exemplary embodiment.
Figure 26:
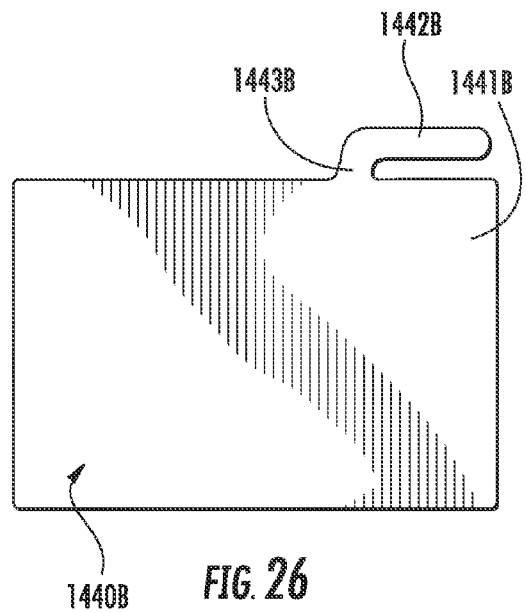
FIG. 26 is a side view of the electrode plate shown in FIG. 25.
Figure 27:
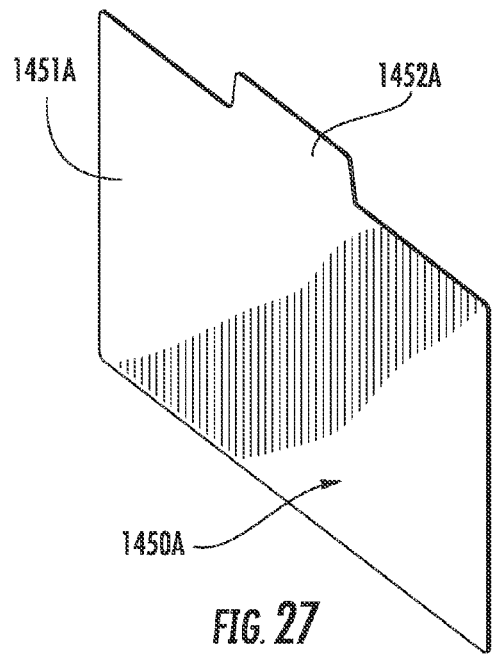
FIG. 27 is a perspective view of an electrode plate for an electrochemical cell according to another exemplary embodiment.
Figure 28:
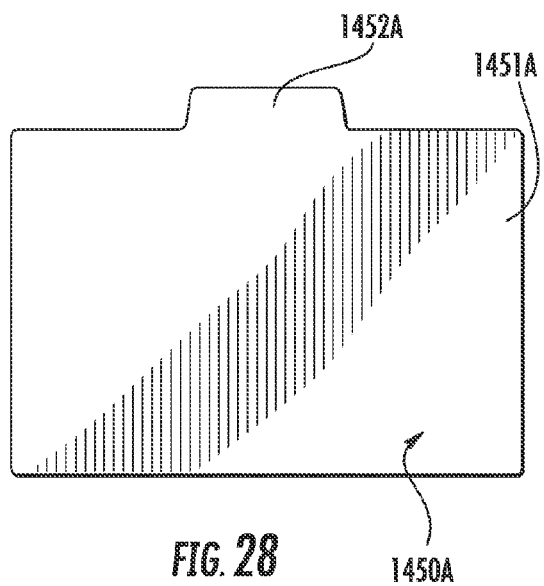
FIG. 28 is a side view of the electrode plate shown in FIG. 27.
Figure 29:
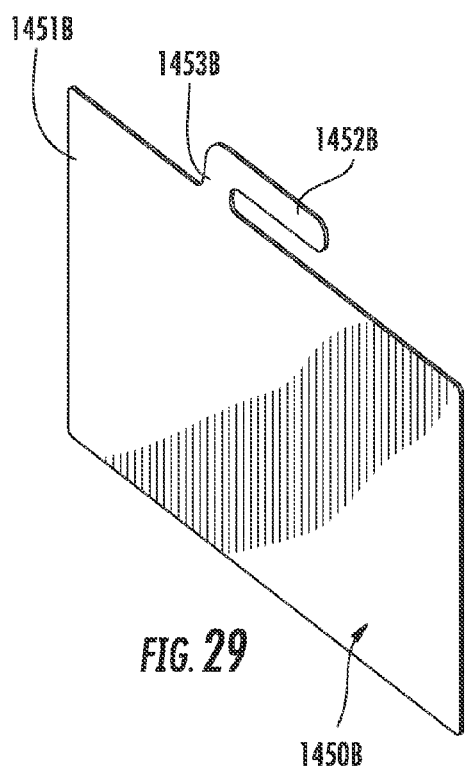
FIG. 29 is a perspective view of an electrode plate for an electrochemical cell according to another exemplary embodiment.
Figure 30:
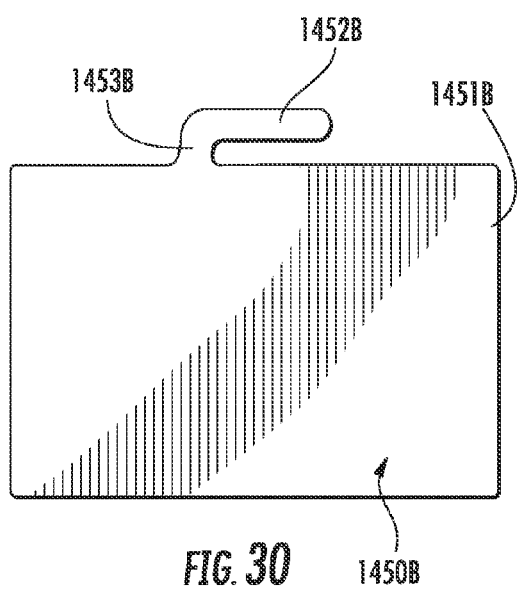
FIG. 30 is a side view of the electrode plate shown in FIG. 29.

According to another exemplary embodiment, the upper tray 1316 also comprises openings or apertures 1324 that expose a portion of the bus bar 1314 (e.g., the end of the bus bar 1314 having an aperture 1326) to be coupled (e.g., with a fastener, by welding, etc.) to a terminal 1328 of an adjacent cell 1310. According to an exemplary embodiment, the terminal 1328 of the adjacent cell 1310 is threaded (e.g., to receive a fastener 1329, as shown in FIG. 22). According to another exemplary embodiment, the terminal 1328 of the adjacent cell 1310 may be flat so that the terminal 1328 may be welded to the bus bar 1314. The upper tray 1316 may be made of a polymer (e.g., polypropylene, polyethylene, etc.) or any other suitable material (e.g., insulative material).

Still referring to FIG. 11, the battery module 1300 is shown to include a seal 1330 provided along an upper surface of the lower tray 1318 in order to seal a chamber (not shown) located inside the lower tray 1318. According to an exemplary embodiment, the seal 1330 is configured to seal the gap between the lower portion of the cells 1310 and the lower tray 1318 (when the cells 1310 are placed in the lower tray 1318). According to an exemplary embodiment, the seal 1330 may be constructed from silicone (e.g., molded silicone) or other appropriate material.

According to an exemplary embodiment, the seal 1330 is configured to aid in containing any gases that are vented from the cells 1310 into the chamber. For example, gases may be vented from the cells 1310 via a vent device or vent feature 1334 located at the lower end of each of the cells 1310 (shown, e.g., in FIGS. 13-14). According to another exemplary embodiment, an opening or outlet 1336 (e.g., as shown in FIG. 11) may be provided in fluid connection with the chamber. The outlet 1336 may be used to direct gases from the chamber (after having been vented from the cells 1310) to outside the battery module 1300 (e.g., outside the vehicle).

Figure 12:
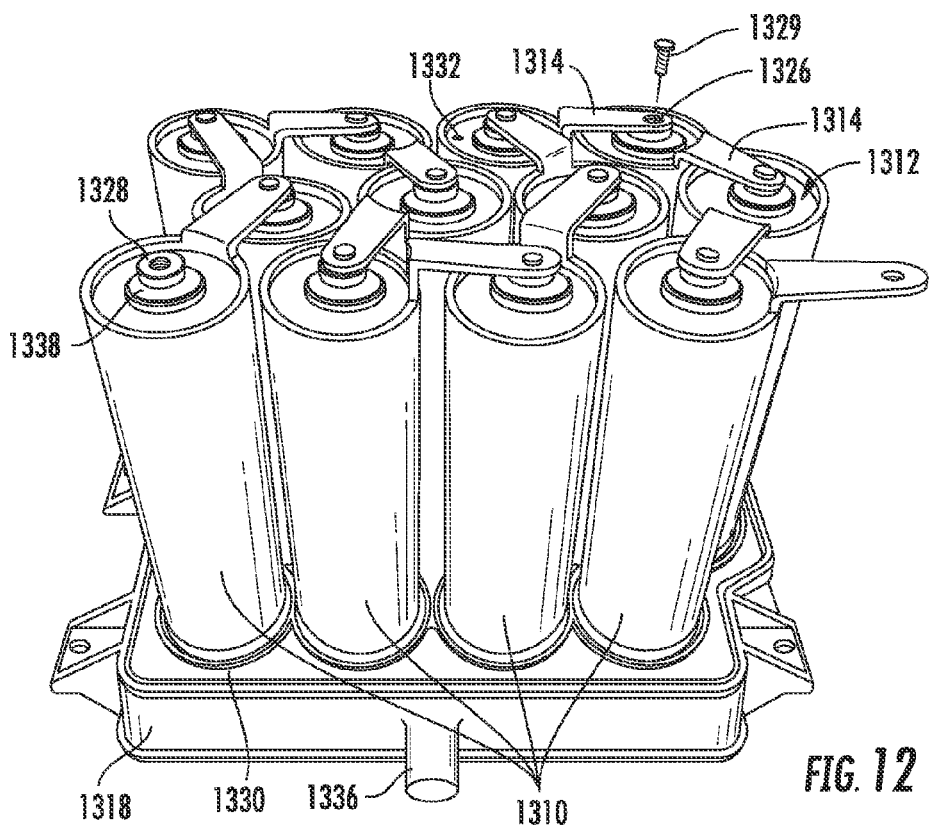
FIG. 12 is a perspective view of the battery module as shown in FIG. 11 with an upper tray removed.

Referring now to FIG. 12, the battery module 1300 is shown with the upper tray 1316 removed. As can be seen in FIG. 12, the bus bars 1314 of the cells 1310 are properly oriented so that they are ready for connection to a terminal 1328 of an adjacent cell 1310 (or for connection to another module 1300 or other component of the battery system). According to another exemplary embodiment, the battery module 1300 may also include an aperture or hole shown as fill hole 1332 in the lid 1312 of the cell 1310. The fill hole 1332 allows a substance (e.g., an electrolyte) to enter the cell 1310.

Figure 13:
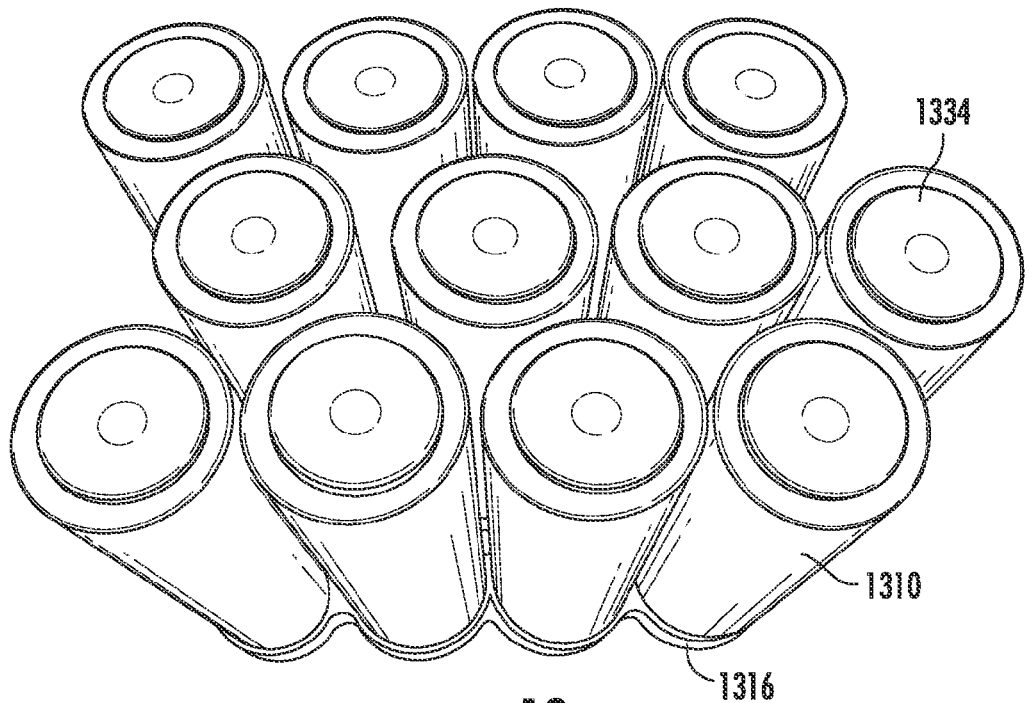
FIG. 13 is a perspective view of a plurality of electrochemical cells provided in an upper tray according to an exemplary embodiment.
Figure 14:
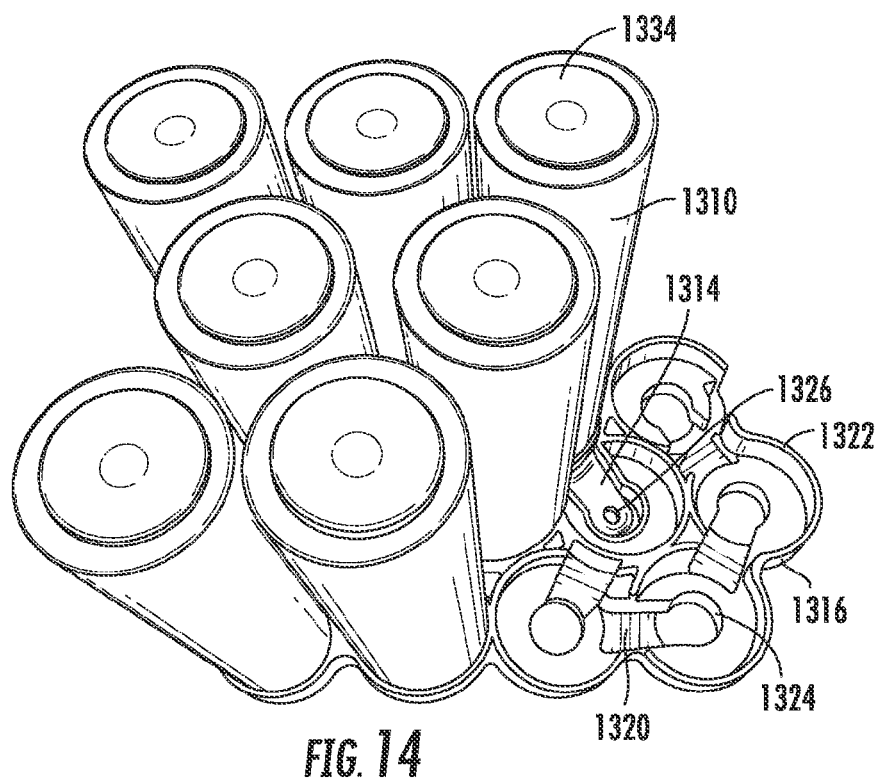
FIG. 14 is a perspective view of a plurality of electrochemical cells provided in an upper tray according to an exemplary embodiment.
Figure 15:
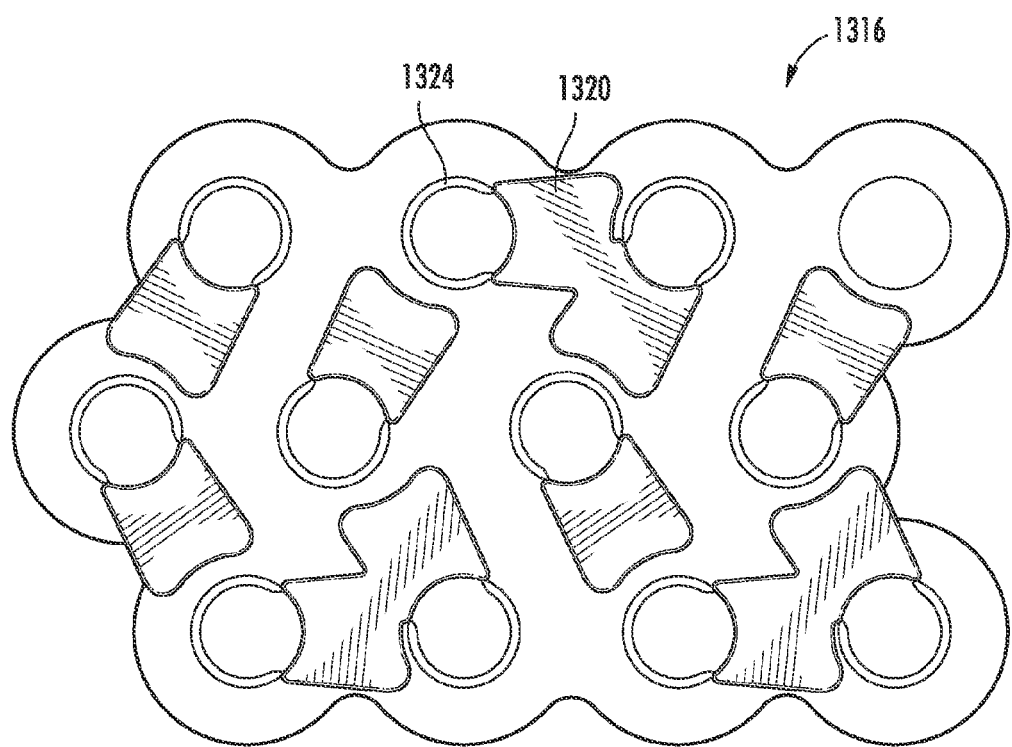
FIG. 15 is a top view of the upper tray as shown in FIG. 11.
Figure 16:
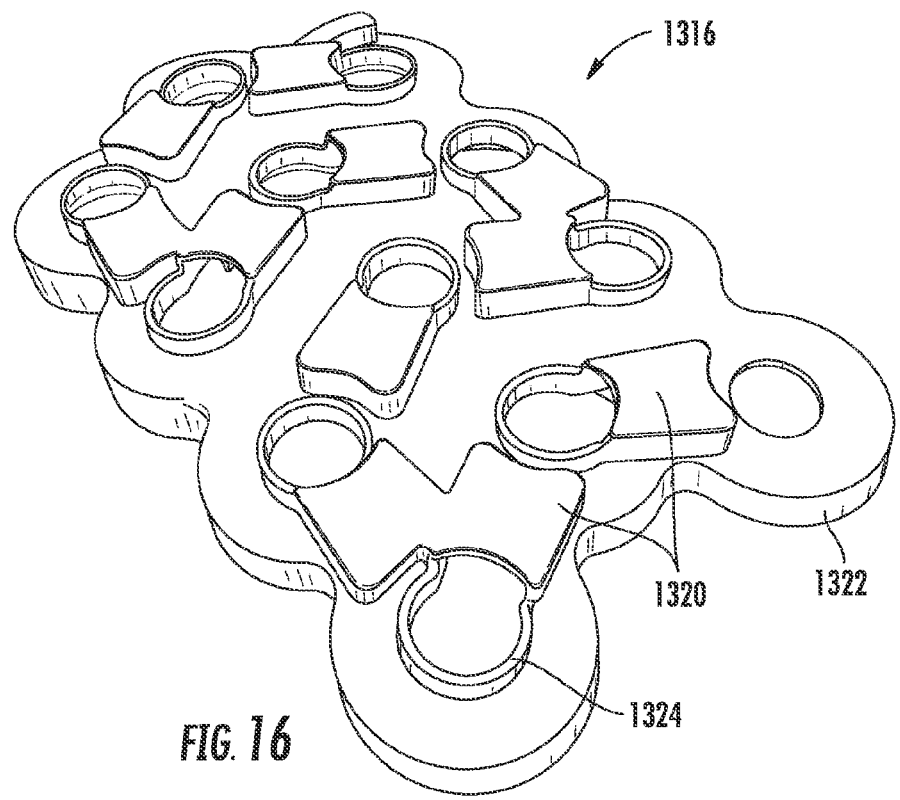
FIG. 16 is a perspective view of the upper tray as shown in FIG. 11.
Figure 17:
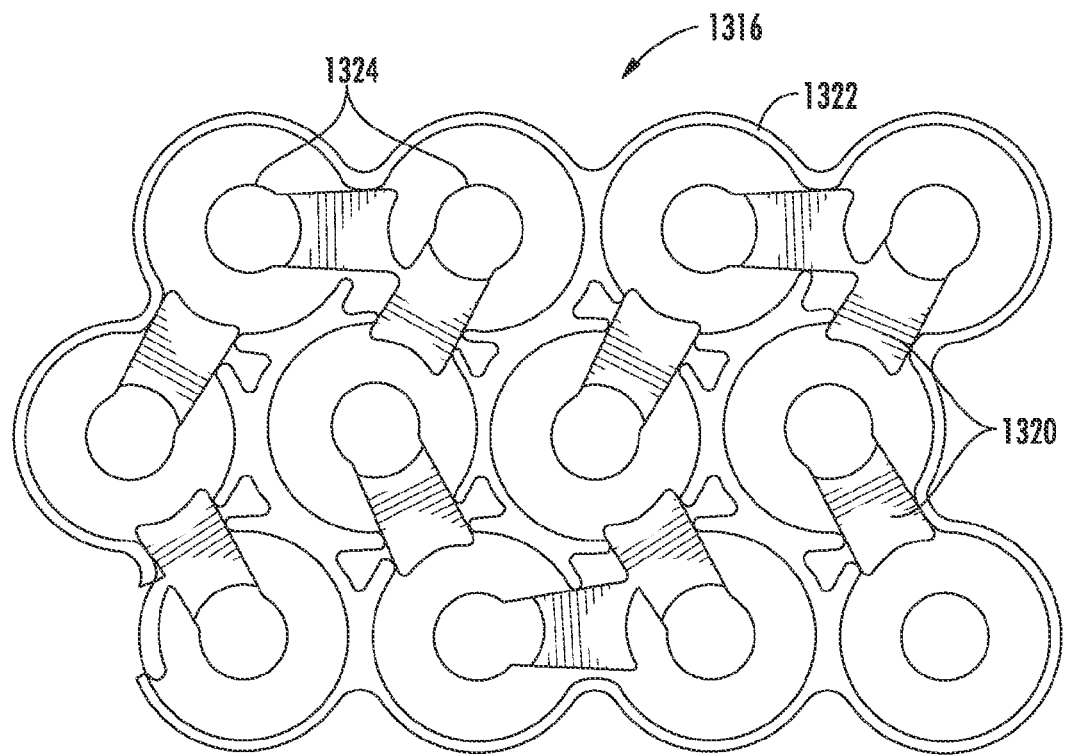
FIG. 17 is a bottom view of the upper tray as shown in FIG. 11.
Figure 18:
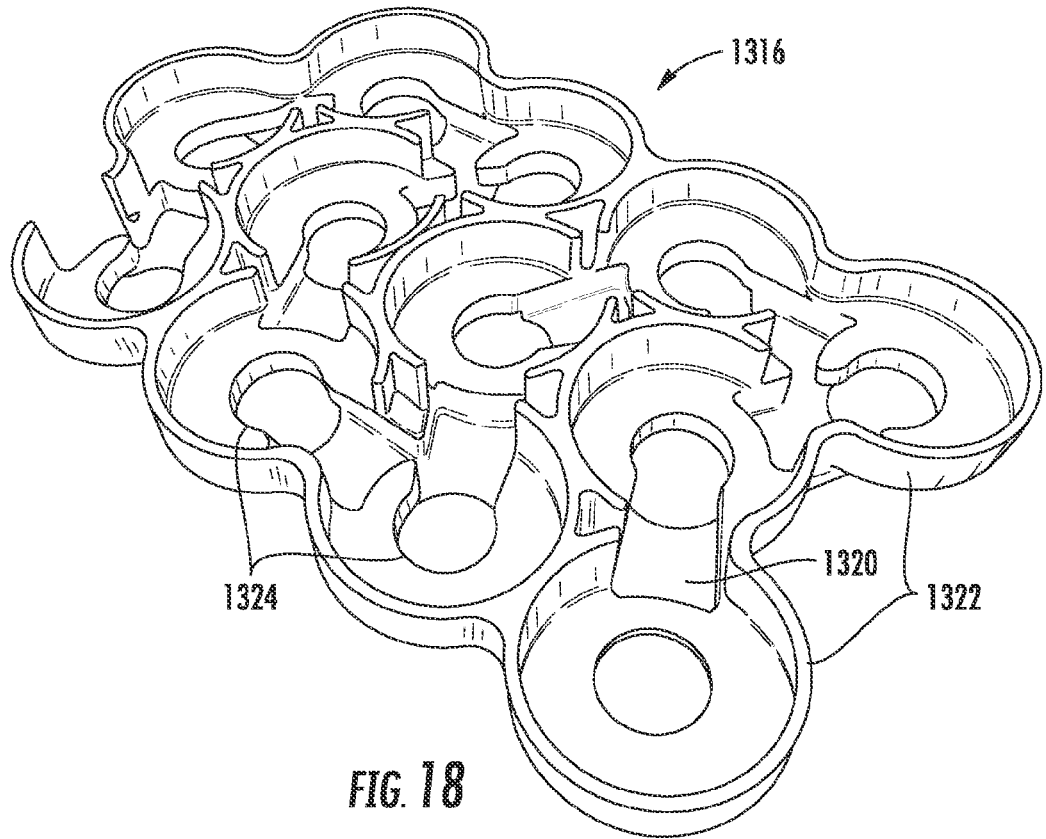
FIG. 18 is a bottom perspective view of the upper tray as shown in FIG. 11.

As shown in FIGS. 13-18, the upper tray 1316 may be used as an assembly tool or fixture according to an exemplary embodiment. As can be seen in FIGS. 13-14, the cells 1310 having the integral bus bars 1314 are provided in the upper tray 1316 (which is provided upside down). The alignment features 1320 (shown as depressions in FIGS. 14, and 17-18) provided in the upper tray 1316 provide for an assembly/fixturing tool for properly aligning and orientating the individual cells 1310 into place when assembling the module 1300. Utilizing the upper tray 1316 as an assembly tool saves time, energy, and money in assembling the battery module 1300. As noted above, the bus bars 1314 used in connection with the upper tray 1316 need not be integral with the lid 1312 (i.e., the upper tray 1316 will still be able to properly align and orientate cells 1310 having non-integral bus bars 1314).

The cells 1310 (having either an integral bus bar 1314 or a separate bus bar coupled to the lid 1312) are provided upside down into the upper tray 1316 (i.e., the end of the cell 1310 having the lid 1312 and bus bar 1314 are placed into the upper tray 1316). The bus bar 1314 of each individual cell 1310 will be aligned for proper coupling with the terminal 1328 of another cell 1310 (or to other components of the battery module 1300 or battery system). Additionally, the wall features 1322 of the upper tray 1316 may aid in properly locating the individual cells 1310.

Once all of the cells 1310 are properly located in the upper tray 1316, the bottom tray 1318 is assembled to the cells 1310 (again, upside down). The bottom tray 1318 may have a seal 1330 provided on it to seal the lower end of the cells 1310 (as shown in FIG. 11). The battery module 1300 is then turned right side up where the bus bars 1314 are then coupled to their respective terminal 1328 (e.g., by a fastener, by welding, etc.).

Figure 19:
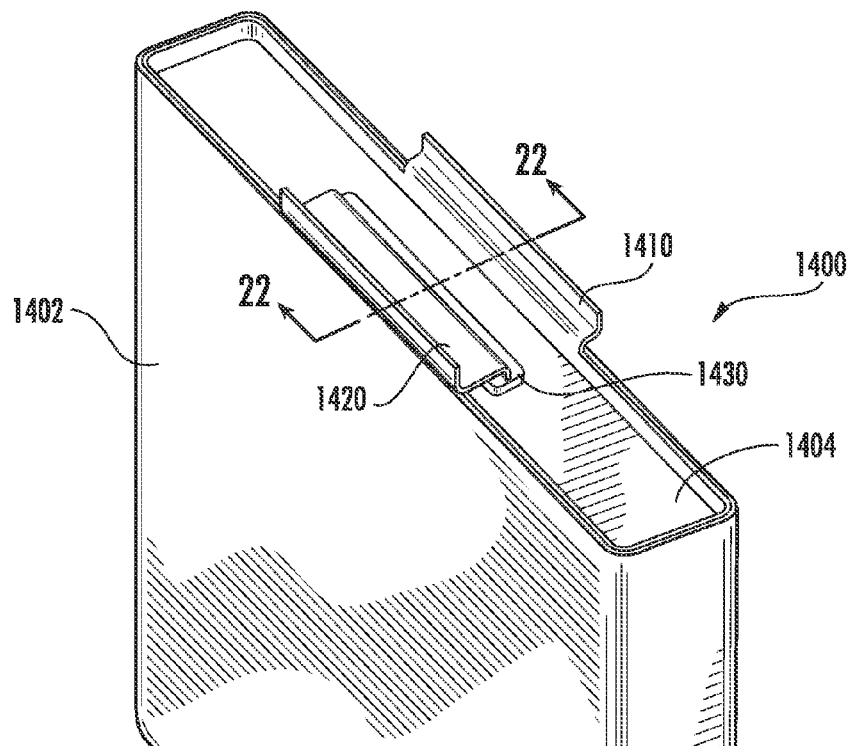
FIG. 19 is a perspective view of an electrochemical cell according to another exemplary embodiment.
Figure 19A:
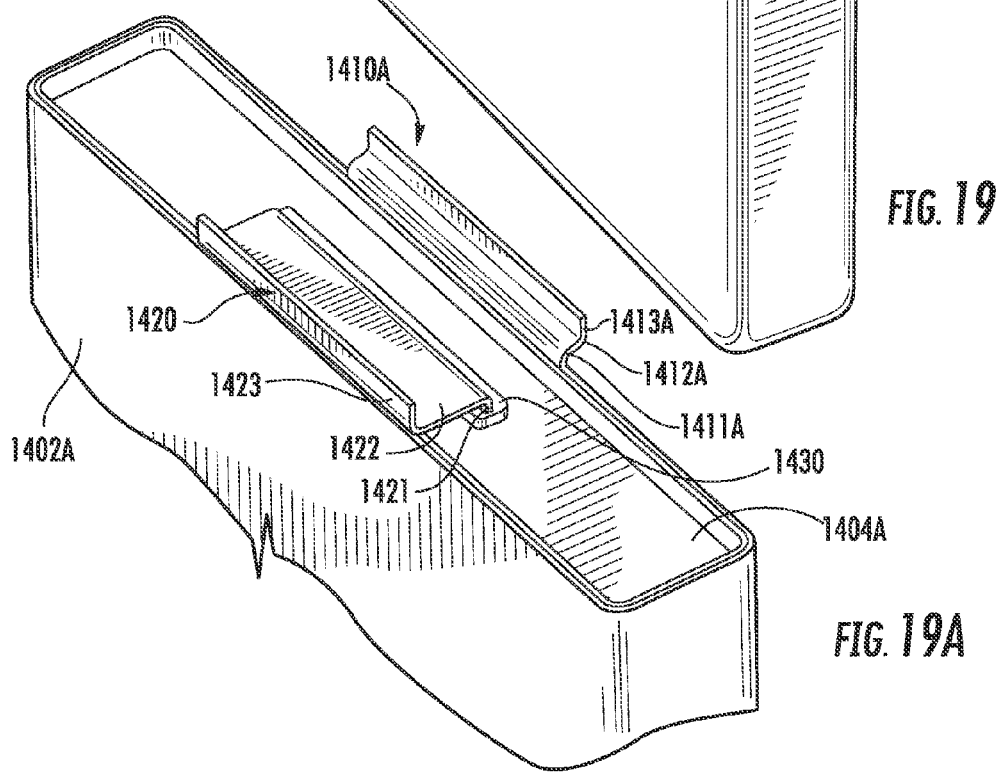
FIG. 19A is a perspective view of a portion of an electrochemical cell according to another exemplary embodiment.

Referring now to FIGS. 19-34, an electrochemical cell 1400 is shown according to another exemplary embodiment (with FIG. 19A representing another exemplary embodiment in which a first member or terminal is integrally formed with a housing of the electrochemical cell). Although the electrochemical cell 1400 shown in FIGS. 19-34 is shown as a prismatic cell, the electrochemical cell 1400 may have other physical shapes and/or configurations according to other exemplary embodiments. For example, the electrochemical cell 1400 may be oval, cylindrical, polygonal, etc. Additionally, the capacity, size, design, and other features of the electrochemical cell 1400 may also differ from those shown according to other exemplary embodiments.

According to one exemplary embodiment, the electrochemical cell 1400 is a lithium-ion cell configured to store an electrical charge. According to other exemplary embodiments, the electrochemical cell 1400 may be a nickel-metal-hydride cell, a lithium polymer cell, or other type of electrochemical cell now known or hereafter developed.

Figure 21:
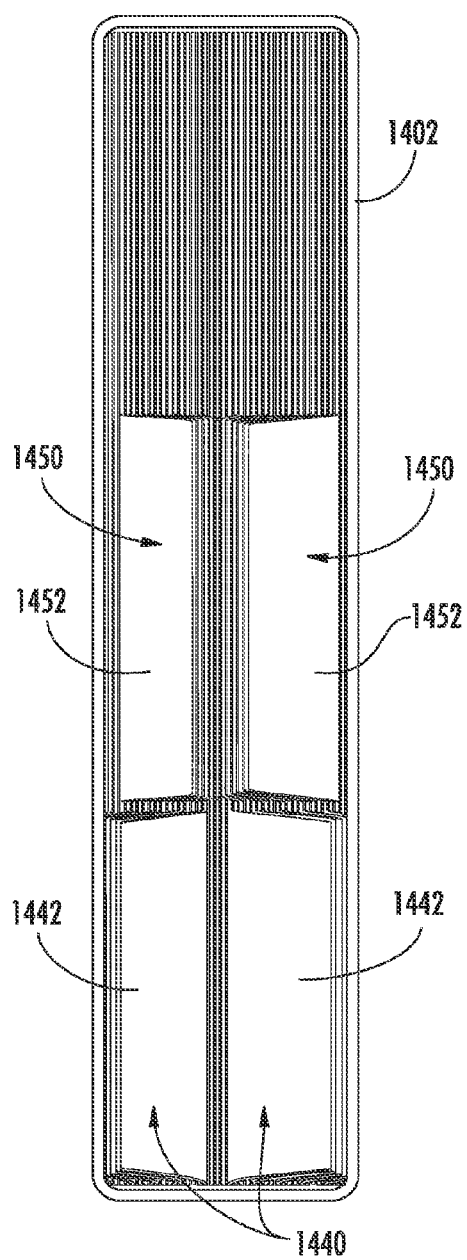
FIG. 21 is a top view of the electrochemical cell shown in FIG. 20.

As shown in FIG. 19, according to an exemplary embodiment, the electrochemical cell 1400 includes a can or housing 1402 configured to contain a plurality of positive electrode plates 1440, a plurality of negative electrode plates 1450, and a plurality of separators 1460 (e.g., as shown in FIGS. 20-22).

The electrochemical cell 1400 also includes a member shown as a cover or lid 1404 that is provided within an opening 1406 (see, e.g., FIG. 20) at the top of the housing 1402 to close the housing 1402. According to one exemplary embodiment, the lid 1404 is conductively coupled to the housing 1402. For example, the lid 1404 may be welded to the housing 1402 (e.g., laser welded). According to another exemplary embodiment, the lid 1404 may be press fit into the opening 1406 in the housing 1402 (e.g., the lid 1404 may have an interference fit with the housing 1402). Additionally, the electrochemical cell 1400 may also contain an electrolyte (not shown).

According to an exemplary embodiment, the housing 1402 and/or lid 1404 may be constructed from aluminum or an aluminum alloy. However, according to other exemplary embodiments, the housing 1402 and/or lid 1404 may be constructed from other suitable materials. According to an exemplary embodiment, the housing 1402 is formed from a metal stamping operation (e.g., such as a deep draw operation) or other suitable operation. The lid 1404 may also be formed from a metal stamping operation or other suitable operation.

As shown in FIG. 19, according to an exemplary embodiment, the electrochemical cell 1400 includes a first member 1410 (e.g., flange, protrusion, projection, extension, arm, etc.) that is configured to act as a first terminal for the electrochemical cell 1400. According to one exemplary embodiment, the first member 1410 is integrally formed with the lid 1404 (i.e., the first member 1410 and the lid 1404 are formed as a single unitary body). According to another exemplary embodiment (e.g., such as shown in FIG. 19A), a first member 1410A may be integrally formed with the housing 1402A (i.e., the first member 1410A and the lid 1404A are formed as a single unitary body). According to another exemplary embodiment, the first member 1410, 1410A may be formed as a separate component that is then coupled (e.g., welded) to the lid 1404, 1404A and/or housing 1402, 1402A.

For clarity purposes, only the first member 1410 will be described in further detail below. However, as one of ordinary skill in the art would readily recognize, the description of the first member 1410 also applies to the first member 1410A. As shown in FIGS. 19-19A and 22, according to an exemplary embodiment, the first member 1410 includes a first portion 1411 (e.g., flange, protrusion, projection, extension, arm, surface, etc.) that extends in a generally parallel direction with respect to a longitudinal axis 1408 (e.g., such as shown in FIG. 22) of the electrochemical cell 1400. The first member 1410 also includes a second portion 1412 (e.g., flange, protrusion, projection, extension, arm, surface, etc.) that extends in a generally perpendicular direction to the longitudinal axis 1408 (e.g., the second portion 1412 extends at substantially a right angle (or other suitable angle) to the first portion 1411 and away from the center of the electrochemical cell 1400). The first member 1410 further includes a third portion 1413 (e.g., flange, protrusion, projection, extension, arm, surface, etc.) that extends in a direction generally parallel with the longitudinal axis 1408 (and at substantially a right angle (or other suitable angle) to the second portion 1412).

According to one exemplary embodiment, the various portions 1411, 1412, 1413 of the first member 1410 may all have the same thickness. However, according to other exemplary embodiments, the thicknesses of the various portions 1411, 1412, 1413 of the first member 1410 may vary from one another. According to an exemplary embodiment, the first member 1410 is formed from aluminum or an aluminum alloy. However, according to other exemplary embodiments, the first member 1410 may be formed from other suitable materials.

According to an exemplary embodiment, the electrochemical cell 1400 also includes a second member 1420 (e.g., flange, protrusion, projection, extension, arm, etc.) that is configured to act as a second terminal for the electrochemical cell 1400 and having a first portion 1421 that extends through the lid 1404 in a first direction and a second portion 1422 that extends in a second direction different from the first direction (e.g., the second portion 1422 extends perpendicular to the first portion 1421). The second member 1420 is electrically isolated or insulated from the lid 1404 and/or housing 1402 of the electrochemical cell 1400 (e.g., by an insulating member shown as an insulator 1430) and is configured to have a polarity that is opposite the polarity of the first terminal.

According to an exemplary embodiment, the first member 1410 is a positive terminal for the electrochemical cell 1400 and the second member 1420 is a negative terminal for the electrochemical cell 1400. According to another exemplary embodiment, the first member 1410 is a negative terminal for the electrochemical cell 1400 and the second member 1420 is a positive terminal for the electrochemical cell 1400.

According to an exemplary embodiment, the second member 1420 includes a first portion 1421 (e.g., flange, protrusion, projection, extension, arm, surface, etc.) that extends through an aperture or opening in the lid 1404 (e.g., such as shown in FIG. 22). The first portion 1421 is generally parallel to the direction of the longitudinal axis 1408 of the electrochemical cell 1400. The second member 1420 also includes a second portion 1422 (e.g., flange, protrusion, projection, extension, arm, surface, etc.) extending at substantially a right angle (or other suitable angle) from the first portion 1421 of the second member 1420 in a direction that is generally perpendicular to the longitudinal axis 1408 of the electrochemical cell 1400. The second member 1420 further includes a third portion 1423 (e.g., flange, protrusion, projection, extension, arm, surface, etc.) that extends at substantially a right angle (or other suitable angle) to the second portion 1422 of the second member 1420 in a direction generally parallel to the longitudinal axis 1408 of the electrochemical cell 1400.

According to an exemplary embodiment, as shown in FIG. 22, the second member 1420 further includes a fourth portion or member shown as a current collector 1424. The current collector 1424 is configured to be coupled to tabs of the electrode plates (e.g., as shown in FIG. 22) as will be described in more detail below. As shown in FIG. 22, the current collector 1424 is generally perpendicular to the first portion 1421 of the second member 1420, but according to other exemplary embodiments, the current collector 1424 may not be perpendicular to the first portion 1421.

According to other exemplary embodiments, the current collector may be otherwise configured. For example, the current collector 1424 may extend out from the first portion 1421 in only a single direction (as opposed to two directions with respect to the longitudinal axis 1408 as shown in FIG. 22). Additionally, the current collector 1424 may be curved (e.g., the current collector may have a convex or concave shape) instead of that shown in FIG. 22.

According to one exemplary embodiment, the second member 1420 is formed as a single unitary body (e.g., one-piece construction). For example, the second member 1420 may be formed from a metal stamping operation, but according to other exemplary embodiments, the second member 1420 may be formed by any suitable method. According to another exemplary embodiment, the second member 1420 may be formed from multiple components that are later coupled (e.g., welded) together.

According to one exemplary embodiment, the various portions 1421, 1422, 1423, 1424 of the second member 1420 may all have the same thickness. However, according to other exemplary embodiments, the thicknesses of the various portions 1421, 1422, 1423, 1424 of the second member 1420 may vary from one another. According to an exemplary embodiment, the second member 1420 is formed from copper or a copper alloy. However, according to other exemplary embodiments, the second member 1420 may be formed from other suitable materials.

According to an exemplary embodiment, the first and second members 1410, 1420 are located generally in the middle of the top of the electrochemical cell 1400. However, according to other exemplary embodiments, the first and second members 1410, 1420 may be located elsewhere. For example, the first and second members 1410, 1420 may be located at either end of the top of the electrochemical cell 1400. Additionally, the first and second members 1410, 1420 may be located at opposite ends of the electrochemical cell 1400 (e.g., the first member 1410 may be located on the top of the electrochemical cell 1400 while the second member 1420 is located on the bottom of the electrochemical cell 1400, or vice versa). Additionally, the first and second members 1410, 1420 may be located on a bottom or a side of the electrochemical cell 1400.

According to an exemplary embodiment, the insulator 1430 is provided adjacent (e.g., around, next to, about, etc.) the first portion 1421 of the second member 1420 to electrically insulate the second member 1420 from the lid 1404 and/or the housing 1402. As best seen in FIG. 22, the insulator 1430 includes a first portion 1431 on a top side of the lid 1404 and a second portion 1432 on a bottom side of the lid 1404. According to an exemplary embodiment, the lid 1404 is sandwiched between the first and second portions 1431, 1432 of the insulator 1430. According to an exemplary embodiment, the insulator 1430 is constructed from an electrically insulating material such as polypropylene, polyethylene, or other suitable material.

Referring now to FIGS. 20-22, a plurality of electrode plates and separators are shown within the housing 1402 of the electrochemical cell 1400. As shown best in FIG. 20A, according to an exemplary embodiment, the electrode plates and separators are arranged (e.g., stacked, provided, assembled, etc.) in an alternating fashion. For example, a positive electrode plate 1440 is provided next to a separator 1460, which is then followed by a negative electrode plate 1450 and another separator 1460, with the pattern repeating thereafter. According to an exemplary embodiment, an insulating member (not shown) may be provided around the outside surface of the electrode plate stack (i.e., the stacked positive and negative electrode plates and separators).

According to an exemplary embodiment, the electrode plates 1440, 1450 and separators 1460 are stacked in a relatively dense arrangement (i.e., close to one another) so that the electrochemical cell 1400 may have as high a power density as possible. According to one exemplary embodiment, there are approximately 50-70 positive electrode plates 1440 and there are approximately 50-70 negative electrode plates 1450 per electrochemical cell 1400. However, according to other exemplary embodiments, there may be a greater or lesser number of positive electrode plates 1440 and negative electrode plates 1450 per electrochemical cell 1400.

According to an exemplary embodiment, a projection or tab 1442, 1452 extends from a top portion or edge of each of the electrode plates 1440, 1450 (e.g., such as shown in FIGS. 23-30). According to one exemplary embodiment, the positive electrode plates 1440 have a tab 1442 that is adjacent an end of the top or edge of the electrode plate, while the negative electrode plates 1450 have a tab 1452 that is generally provided in the middle of the top or edge of the negative electrode plate 1450. However, according to other exemplary embodiments, the tabs 1442, 1452 of either the positive or negative electrode plates 1440, 1450 may be located elsewhere.

As shown in FIGS. 20-21, according to an exemplary embodiment, the tabs 1442 of the positive electrode plates 1440 are biased (e.g., pinched, squeezed, pressed, etc.) toward the housing 1402 such that the tabs 1442 may be easily and efficiently coupled to the housing 1402. According to an exemplary embodiment, the tabs 1442 of the positive electrode plates 1440 are conductively coupled to the housing 1402 by a welding operation (e.g., a laser welding operation). As such, the housing 1402 will have the same polarity as the positive electrode plates 1440 (since the housing 1402 is conductively connected to the positive electrode plates 1440). According to one exemplary embodiment, approximately half of the positive electrode tabs 1442 are biased towards one side of the housing 1402, while the other half of the positive electrode tabs 1442 are biased towards the other side of the housing 1402.

According to an exemplary embodiment, the negative electrode tabs 1452 are biased (e.g., pinched, squeezed, pressed, etc.) towards the center of the electrode plate stack. As shown in FIG. 22, the negative electrode tabs 1452 are then conductively coupled (e.g., laser welded) to the current collector 1424 of the second member 1420.

As shown in FIG. 22, the positive electrode plates 1440 extend further than either the separators 1460 or the negative electrode plates 1450 adjacent the bottom of the housing 1402 of the electrochemical cell 1400. According to an exemplary embodiment, the positive electrode plates 1440 are in contact with the bottom of the housing 1402 of the electrochemical cell 1400.

According to an exemplary embodiment, the positive electrode plates 1440 are constructed from aluminum or an aluminum alloy, but according to other exemplary embodiments may be constructed from other suitable materials. According to an exemplary embodiment the negative electrode plates 1450 are constructed from copper or a copper alloy, but according to other exemplary embodiments may be constructed from other suitable materials. According to an exemplary embodiment, the separators 1460 may be constructed from any suitable material (e.g., polyethylene, polypropylene, polyimide, etc.). According to another exemplary embodiment, the separators 1460 may contain ceramic fillers within the separator material (e.g., within the polymer material).

Referring now to FIGS. 23-30, several configurations of electrode plates 1440, 1450 are shown according to various exemplary embodiments. The electrode plates 1440, 1450 include a generally rectangular body portion 1441, 1451 and a tab 1442, 1452 (e.g., projection, protrusion, arm, flange, member, etc.) extending out from an edge of the body portion 1441, 1451 of the electrode plate 1440, 1450. As seen in FIGS. 23-26, the tab 1442 is located on the top edge of the electrode plate 1440 adjacent a side of the electrode plate 1440. As shown in FIGS. 27-30, the tab 1452 is located generally in the middle of the top edge of the electrode plate 1450. According to other exemplary embodiments, the tabs 1442, 1452 of the electrode plates 1440, 1450 may be located elsewhere.

As shown in FIGS. 23-24 and 27-28, the tab 1442A, 1452A is shown as a generally rectilinear member (e.g., such as a tab found on a paper file). FIGS. 25-26 and 29-30 show an alternative configuration of a tab 1442B, 1452B that extends out from the electrode plate 1440B, 1450B at a neck region 1443B, 1453B. The tab 1442B, 1452B then extends away from the neck region 1443B, 1453B at a generally right angle to the neck region 1443B, 1453B. According to an exemplary embodiment, the tab 1442B, 1452B may have generally rounded edges (as shown FIGS. 25-26 and 29-30) or may have non-rounded edges. It should be noted that one of ordinary skill in the art would readily recognize that many different configurations and combinations of electrode plates and/or tabs may be utilized in the electrochemical cell 1400.

Figure 31:
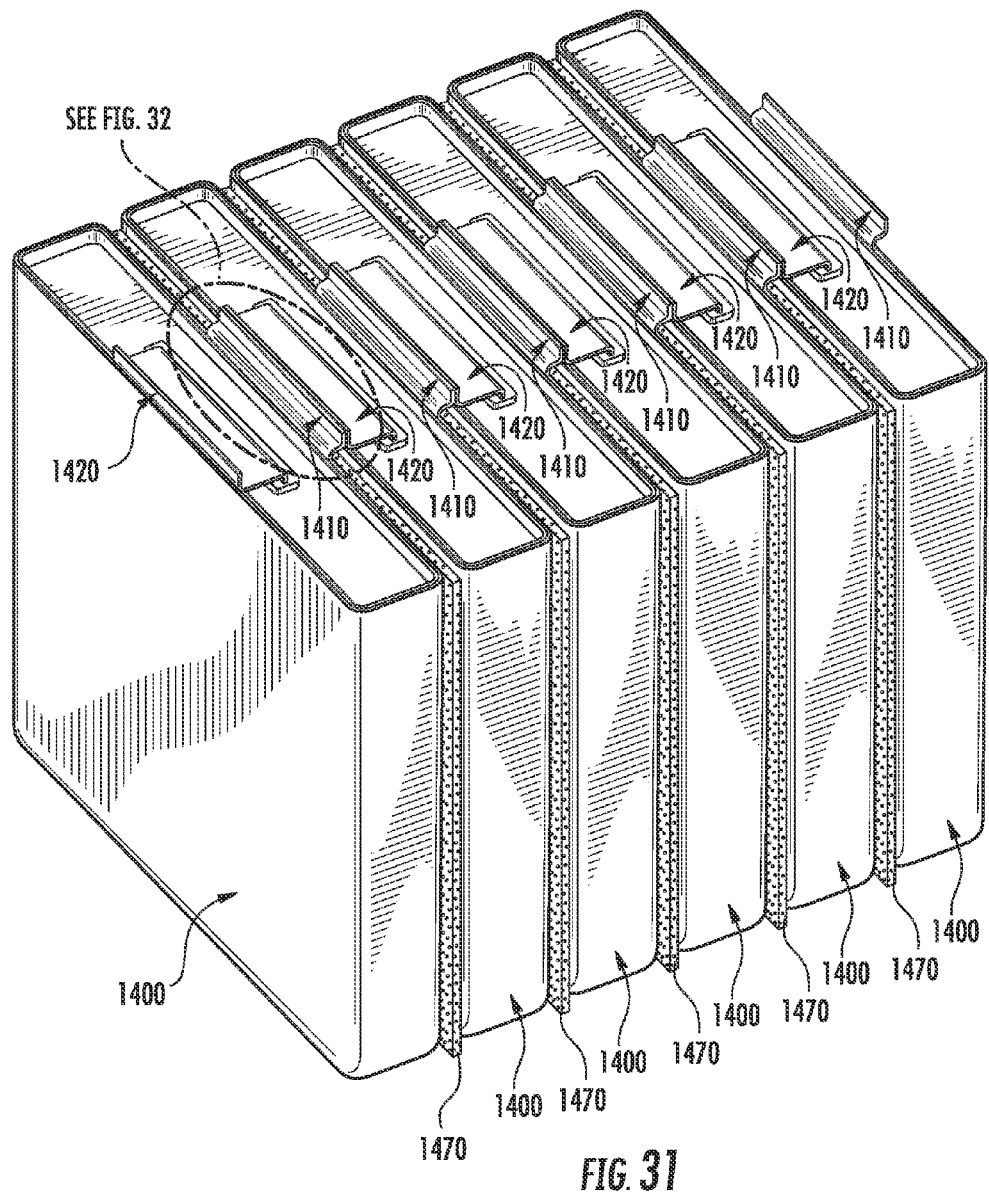
FIG. 31 is a perspective view of a portion of a battery module containing a plurality of electrochemical cells as shown in FIG. 19 according to an exemplary embodiment.

Referring now to FIG. 31, a plurality of electrochemical cells 1400 are provided adjacent one another to form a battery module. Although illustrated in FIG. 31 as having a particular number of electrochemical cells 1400 (e.g., six electrochemical cells), it should be noted that according to other exemplary embodiments, a different number and/or arrangement of electrochemical cells 1400 may be used depending on any of a variety of considerations (e.g., the desired power for the battery module, the available space within which the battery module must fit, etc.).

As shown in FIG. 31, a first terminal 1410 of a first electrochemical cell 1400 is provided adjacent a second terminal 1420 of an adjacent electrochemical cell 1400 such that the first terminal 1410 of the first electrochemical cell 1400 and the second terminal 1420 of the adjacent cell 1400 may be coupled together. According to one exemplary embodiment, a portion or surface of the first terminal 1410 is provided in facing engagement with a portion or surface of the second terminal 1420 of the adjacent electrochemical cell 1400. According to an exemplary embodiment, the first terminal 1410 and the second terminal 1420 are conductively coupled together by a welding operation (e.g., laser welding, ultrasonic welding, etc.), rivets, or fasteners (e.g., screws, bolts, etc.).

According to the exemplary embodiment shown in FIG. 31, an electrically insulating member 1470 is provided between each of the electrochemical cells 1400 to electrically insulate the cells from one another. According to an exemplary embodiment, the electrically insulating member 1470 may be a separate member (e.g., such as a single sheet of electrically insulating material). According to various exemplary embodiments, the electrically insulating member 1470 may be constructed at least partially from polyvinyl chloride (PVC), silicone, polyethylene, polypropylene, or any other suitable material.

According to another exemplary embodiment, the electrically insulating member 1470 may be provided on or formed with the outside of the housing 1402 of the electrochemical cell 1400 before the electrochemical cell 1400 is assembled into a battery module. For example, according to an exemplary embodiment, an insulating material may be sprayed onto the outside of the housing 1402. According to another exemplary embodiment, the housing 1402 may be dip coated with an insulating material. According to yet another exemplary embodiment, the outside of the housing 1402 may be wrapped (e.g., shrink wrapped) with an electrically insulating material. According to various exemplary embodiments, the electrically insulating material may include a polyvinyl chloride (PVC), silicone, polyethylene, polypropylene, or other suitable material.

According to one exemplary embodiment, the electrically insulating member or material may be provided only between the adjacent electrochemical cells 1400 (e.g., only between the sides of adjacent housings 1402). According to another exemplary embodiment, the electrically insulating member or material may be provided all around the housing 1402 (e.g., around all the sides and/or bottom of the housing 1402) of the electrochemical cells 1400, such as when using a spray or dip coating process.

Figures 32A, 32B:
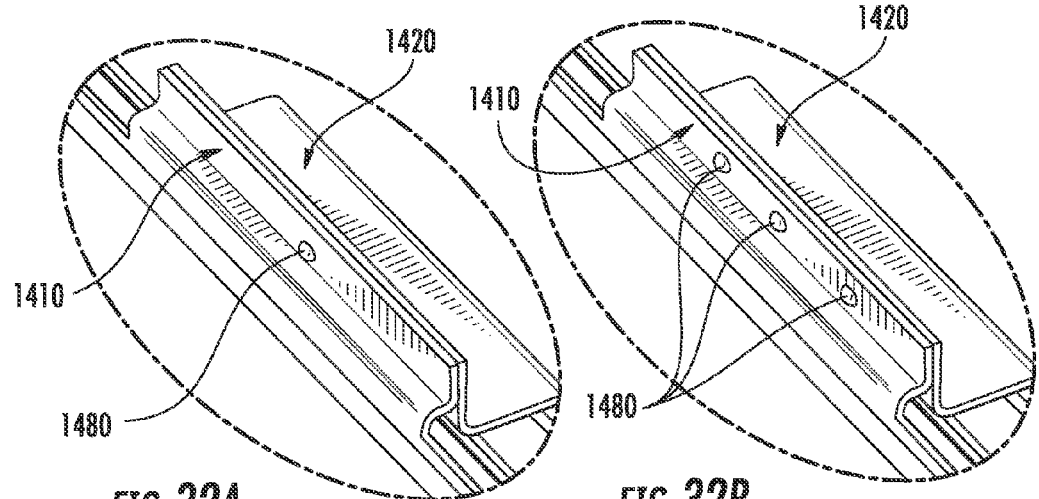
FIGS. 32A-32F are a detail perspective views of a portion of the battery module shown in FIG. 31 showing several methods of coupling a first terminal to a second terminal according to various exemplary embodiments.
Figures 32C, 32D:
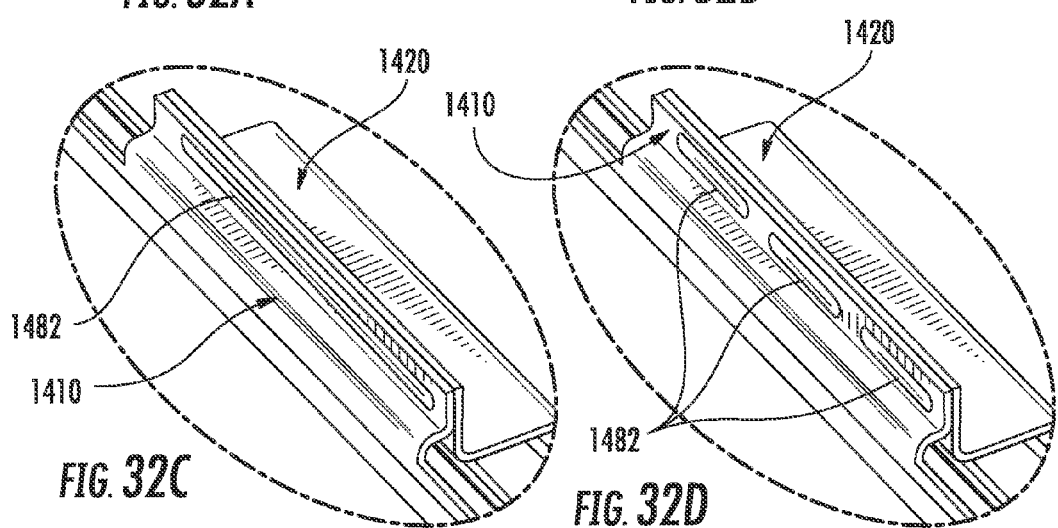

Referring now to FIGS. 32A-32F, several configurations of coupling the terminals 1410, 1420 of adjacent electrochemical cells 1400 together are shown according to various exemplary embodiments. As seen in FIGS. 32A-32B, the terminals 1410, 1420 may be spot welded together (e.g., with a laser welding process). While various numbers of spot welds 1480 are shown in FIGS. 32A-32B, any number of spot welds 1480 may be used to couple the terminals 1410, 1420 together. FIGS. 32C-32D show linear welding of the terminals 1410, 1420. Again, a singular linear weld 1482 (e.g., such as shown in FIG. 32C) or multiple linear welds 1482 (e.g., such as shown in FIG. 32D) may be utilized.

Figures 32E, 32F:
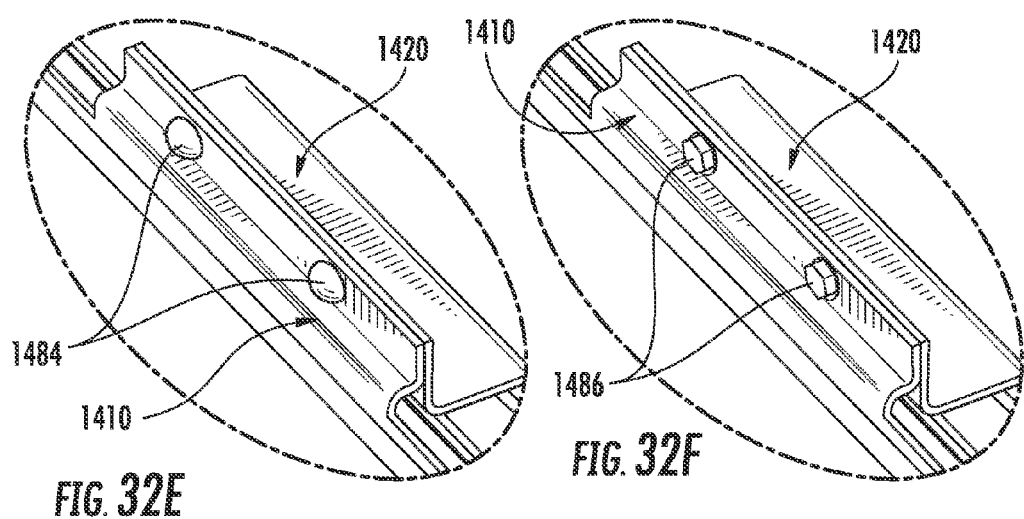

FIGS. 32E-32F show various configurations of fasteners used to couple the terminals 1410, 1420 together. FIG. 32E shows a plurality of pop rivets 1484 used to couple the terminals 1410, 1420 together. However, more or less pop rivets 1484 may be used according to other exemplary embodiments. FIG. 32F shows a plurality of fasteners 1486 (e.g., screws, bolts, etc.) used to couple the terminals 1410, 1420 together. However, more or less fasteners 1486 may be used to couple the terminals 1410, 1420 together according to other exemplary embodiments.

Figure 33:
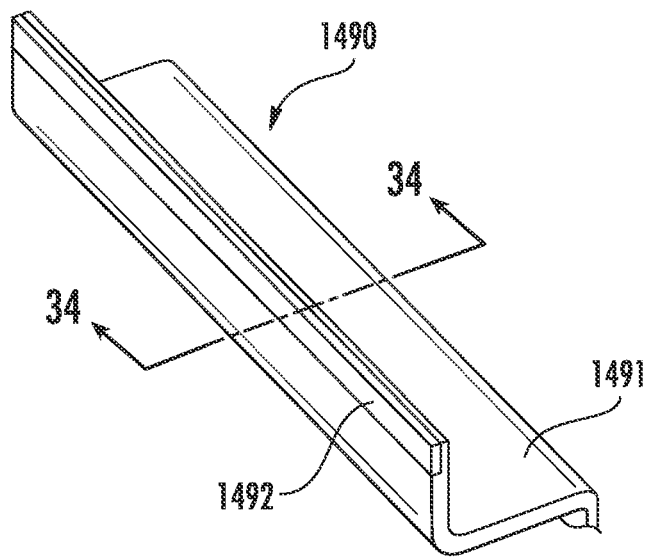
FIG. 33 is a detail perspective view of a terminal for the electrochemical cell shown in FIG. 19 according to an exemplary embodiment.
Figure 34:
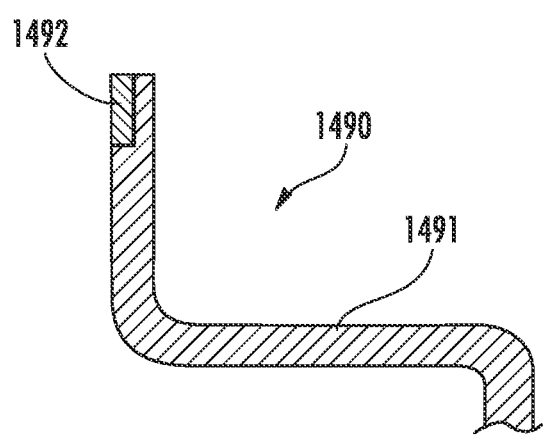
FIG. 34 is a cross-sectional view of the terminal shown in FIG. 33 taken along lines 34-34 in FIG. 33 according to an exemplary embodiment.

Referring now to FIGS. 33-34, a terminal 1490 for an electrochemical cell 1400 is shown according to another exemplary embodiment. While the terminal 1490 is similar to the second terminal 1420 shown in FIG. 19, the terminal 1490 includes a first material 1491 and a second material 1492 that are coupled together to form the terminal 1490. According to one exemplary embodiment, the first material 1491 and the second material 1492 are coupled together with a co-lamination process.

According to an exemplary embodiment, the first material 1491 is copper or a copper alloy. However, according to other exemplary embodiments, the first material 1491 may be any other suitable material. According to another exemplary embodiment, the second material 1492 is aluminum or an aluminum alloy. However, according to other exemplary embodiments, the second material 1492 may be any other suitable material. According to another exemplary embodiment, the first material 1491 may be aluminum or an aluminum alloy and the second material 1492 may be copper or a copper alloy.

One advantage of using a terminal 1490 constructed from multiple materials is that when provided adjacent a corresponding terminal of an adjacent cell 1400, the terminal 1490 (having the multiple materials) may be easily and efficiently welded to the corresponding terminal. This is because the second material 1492 of the terminal 1490 and the material of the corresponding terminal are the same (e.g., both aluminum or aluminum alloy).

One advantageous feature of providing terminals that are integrally formed with a cover, lid, or container for a battery or cell is that the need to separately manufacture and couple the terminal to the cover, lid, or container is eliminated. In this manner, labor and manufacturing costs may be reduced as compared to other cells in which terminals are separately manufactured from the lid, cover, or container (e.g., by eliminating steps in the manufacturing operation). Additionally, providing terminals that are integrally formed reduces the opportunity for failure modes to take effect (e.g., because the terminal is not welded to the cover or container, there is not a weld point which may be a point of electrical shorting or failure).

According to one exemplary embodiment, a battery module includes a plurality of electrochemical cells provided in between a bottom tray and an upper tray. The electrochemical cells may include a housing having a tubular main body, a bottom, and a lid. The bottom may include a vent feature to allow venting of gases and/or effluent from inside the housing. The lid may include a first terminal that is insulated from the lid and a bus bar that is integral to the lid. The integral bus bar may serve as a second terminal of the cell. The battery module may also include a seal provided between the lower end of the cell and the lower tray to seal a chamber configured to receive vented gases from the cells. The upper tray may include features and/or cutouts to help properly align and orientate the cells having integral bus bars.

According to another exemplary embodiment, a battery module includes a plurality of electrochemical cells. Each of the cells comprises a housing having a longitudinal axis and a lid coupled to the housing. The lid includes a member configured to act as a first terminal for the cell. At least a portion of the member extends away from the housing in a direction generally perpendicular to the longitudinal axis. The battery module further includes a structure configured to receive the plurality of cells and includes a plurality of depressions. Each of the plurality of depressions is configured to receive at least a portion of the member such that the member is properly aligned for conductive coupling with a terminal of an adjacent cell.

According to another exemplary embodiment, a battery module includes a plurality of electrochemical cells provided in between a first structure and a second structure. Each of the electrochemical cells includes a feature extending from a top of the electrochemical cells, the feature configured to electrically couple the electrochemical cell to a terminal of an adjacent electrochemical cell or other component of the battery module. The first structure includes features to properly orientate each of the electrochemical cells.

According to another exemplary embodiment, a method of assembling a battery module includes providing a plurality of electrochemical cells in a first structure. Each of the plurality of electrochemical cells has a lid having an integral bus bar. The first structure has features to properly orientate the integral bus bars of each of the plurality of electrochemical cells. The method further includes providing a second structure over the ends of the electrochemical cells.

According to another exemplary embodiment, a method of producing a battery module includes providing a structure. The method also includes providing the plurality of electrochemical cells to the structure such that each of the plurality of depressions of the structure receive the member of each of the plurality of electrochemical cells such that the member is properly aligned for conductive coupling with a terminal of an adjacent cell. The method further includes coupling the member of one of the plurality of electrochemical cells to the terminal of the adjacent cell.

The entire disclosures of the following applications are incorporated herein by reference: U.S. Provisional Patent Application No. 61/088,879, filed Aug. 14, 2008; U.S. Provisional Patent Application No. 61/101,985, filed Oct. 1, 2008; International Patent Application No. PCT/US2007/017785, filed Aug. 10, 2007; and U.S. patent application Ser. No. 12/368,938, filed Feb. 10, 2009.

Those reviewing this disclosure will appreciate that various exemplary embodiments have been shown and described, and that according to various exemplary embodiments, features associated with one exemplary embodiment may be used with features included in other exemplary embodiments.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the battery module having electrochemical cells with integrally formed terminals as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, the battery may be non-cylindrical (e.g., oval, rectangular, etc.), the position of elements may be reversed or otherwise varied (e.g., orientation of terminals), and the battery could be a number of different of types (e.g., nickel metal hydride, lithium ion, lithium polymer, etc.). Accordingly, all such modifications are intended to be included within the scope of the present inventions. The order or sequence of any process or method steps may be varied or re-sequenced according to exemplary embodiments. Other substitutions, modifications, changes and omissions may be made in the design, operating conditions and arrangement of the various exemplary embodiments without departing from the scope of the present invention.

What is claimed is:

1. An electrochemical cell comprising:
   a housing;
   a lid coupled to the housing;
   a first member conductively coupled to the housing and comprising a flange that extends away from the housing and is configured to act as a first terminal for the electrochemical cell; and
   a second member electrically insulated from the lid and configured to act as a second terminal for the electrochemical cell, wherein a first portion of the second member extends through the lid and a second portion of the second member freely extends from the first portion in a direction generally perpendicular to the first portion; wherein the second member comprises a third portion extending at an angle to the second portion of the second member for coupling the electrochemical cell with another electrochemical cell, wherein at least the first member and the third portion of the second member extend beyond an outer surface of the housing, and wherein the outer surface of the housing extends between the lid of the electrochemical cell and a base of the electrochemical cell.

2. The electrochemical cell of claim 1, wherein the first member is integrally formed with the housing.

3. The electrochemical cell of claim 1, wherein the first member is integrally formed with the lid and the lid is conductively coupled to the housing.

4. The electrochemical cell of claim 1, further comprising an electrically insulating member adjacent at least a portion of the first portion of the second member.

5. The electrochemical cell of claim 1, wherein the first member has a first polarity and the second member has a second polarity opposite that of the first polarity.

6. The electrochemical cell of claim 1, wherein one of the first member or the second member comprises aluminum and the other one of the first member or the second member comprises copper.

7. The electrochemical cell of claim 6, wherein the other one of the first member or the second member further comprises a strip of aluminum coupled to the other one of the first member or the second member.

8. The electrochemical cell of claim 1, further comprising a plurality of positive electrode plates and a plurality of negative electrode plates arranged in an alternating fashion.

9. The electrochemical cell of claim 8, further comprising at least one separator provided in between each of the plurality of positive electrode plates and the plurality of negative electrode plates.

10. The electrochemical cell of claim 8, wherein one of the plurality of positive electrode plates or the plurality of negative electrode plates are conductively coupled to the housing and the other one of the plurality of the positive electrode plates or the plurality of negative electrode plates are conductively coupled to the second member.

11. The electrochemical cell of claim 8, wherein each of the plurality of positive electrode plates and the plurality of negative electrode plates comprises a tab provided on an edge of the plate.

12. The electrochemical cell of claim 11, wherein the tab of one of the plurality of positive electrode plates or the plurality of negative electrode plates is located generally in the middle of the edge of the plate and the tab of the other one of the plurality of positive electrode plates or the plurality of negative electrode plates is located generally adjacent an end of the edge of the plate.

13. The electrochemical cell of claim 1, wherein the housing has a generally prismatic shape.

14. The electrochemical cell of claim 1, wherein the third portion of the second member extends from the second portion of the second member in a direction substantially perpendicular to the second portion.

15. An electrochemical cell comprising:
   a housing having a cover conductively coupled thereto;
   a flange that is configured to act as a first terminal of the electrochemical cell, wherein the flange is conductively coupled to the housing; and
   a second terminal electrically insulated from the cover, the second terminal comprising a first portion that extends through an aperture disposed in the cover, a second portion that extends at a generally right angle to the first portion such that the second portion is located outside of the housing, and a third portion that extends at a generally right angle to the second portion, wherein at least the flange of the first terminal and the third portion of the second terminal extend beyond an outer surface of the housing, and the outer surface of the housing extends between the cover of the electrochemical cell and a base of the electrochemical cell.

16. The electrochemical cell of claim 15, wherein the flange is integrally formed with the housing.

17. The electrochemical cell of claim 15, wherein the flange is integrally formed with the cover.

18. The electrochemical cell of claim 15, further comprising an electrically insulating member adjacent at least a portion of the first portion of the second terminal.

19. The electrochemical cell of claim 15, wherein the housing has a generally prismatic shape.

20. A battery module comprising:
a plurality of electrochemical cells, wherein a first electrochemical cell of the plurality of electrochemical cells and a second electrochemical cell of the plurality of electrochemical cells each comprise:
a housing having a lid coupled thereto;
a first member conductively coupled to the housing and having a free end that extends substantially parallel with a longitudinal axis of the electrochemical cell, wherein the first member is configured to act as a first terminal for the electrochemical cell; and
a second member electrically insulated from the lid and configured to act as a second terminal for the electrochemical cell, wherein a first portion of the second member extends through an opening in the lid, a second portion of the second member extends in a direction generally perpendicular to the first portion, and a third portion of the second member extends from the second portion in a direction generally perpendicular to the second portion such that the third portion is a free end of the second member and extends substantially parallel with the longitudinal axis of the electrochemical cell;
wherein the free end of the first member of the first electrochemical cell is coupled with the free end of the second member of the second electrochemical cell.

21. The battery module of claim 20, further comprising an electrically insulating member provided between adjacent electrochemical cells of the plurality of electrochemical cells.

22. The battery module of claim 20, wherein the first and second members of the first electrochemical cell and the first and second members of the second electrochemical cell are disposed on a same side of the battery module.

* * * * *